(12) United States Patent  
Breen et al.

(10) Patent No.: US 9,694,411 B2  
(45) Date of Patent: Jul. 4, 2017

(54) RETRACTABLE STOCK GUIDE AND METHOD FOR METAL FORMING DIES

(71) Applicants: Scott M. Breen, Marne, MI (US); Joel T. Pyper, Grand Rapids, MI (US)

(72) Inventors: Scott M. Breen, Marne, MI (US); Joel T. Pyper, Grand Rapids, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 271 days.

(21) Appl. No.: 14/658,764

(22) Filed: Mar. 16, 2015

(65) Prior Publication Data

US 2015/0190859 A1    Jul. 9, 2015

Related U.S. Application Data

(63) Continuation of application No. 13/713,268, filed on Dec. 13, 2012, now Pat. No. 9,010,169.

(Continued)

(51) Int. Cl.
 *B21D 43/02* (2006.01)
 *B21D 43/00* (2006.01)
 (Continued)

(52) U.S. Cl.
 CPC ........... *B21D 43/003* (2013.01); *B21D 37/08* (2013.01); *B21D 43/023* (2013.01); *B23P 15/24* (2013.01)

(58) Field of Classification Search
 CPC ........ B21D 37/08; B21D 37/10; B21D 43/02; B21D 43/021; B21D 43/003; B21D 43/023; B21D 45/003; B21D 45/04
 See application file for complete search history.

(56) References Cited

U.S. PATENT DOCUMENTS 2,979,004 A * 4/1961 Kenville .............. B21D 22/206
 72/345
3,848,452 A * 11/1974 Gargrave .............. B21D 37/10
 72/448

(Continued)

FOREIGN PATENT DOCUMENTS

FR    2966370    4/2012
JP    07155867    6/1995

OTHER PUBLICATIONS

Standard Lifters, Inc., "Prior Art Stock Guide Methods," p. 20, publication date approximately Feb. 1, 2012.

(Continued)

*Primary Examiner* — Edward Tolan
(74) *Attorney, Agent, or Firm* — Price Heneveld LLP

(57) ABSTRACT

A retractable stock guide has a stationary guide rail on which a retractable guide cap is operably supported. The guide rail and cap have two through holes at opposite ends through which two mounting studs extend to attach the stock guide to an associated die member. The holes in the guide cap are ovate, and the heads of the mounting studs are tapered, whereby tightening of the mounting stud shifts the guide cap relative to the guide rail from an aligned, retracted load/unload condition, to an inwardly protruding, extended run condition, wherein the stock strip is slidingly captured between two like stock guides and the mounting surface of the die. Two ball bearing guides can be substituted for the stationary guide rail.

20 Claims, 14 Drawing Sheets

Related U.S. Application Data

(60) Provisional application No. 61/587,191, filed on Jan. 17, 2012.

(51) Int. Cl.
  *B23P 15/24* (2006.01)
  *B21D 37/08* (2006.01)

(56) References Cited

U.S. PATENT DOCUMENTS

| | | | | |
|---|---|---|---|---|
| 4,033,168 A | * | 7/1977 | Fisk | B21D 22/206 |
| | | | | 72/344 |
| 4,282,736 A | * | 8/1981 | Mashburn | B21D 43/023 |
| | | | | 72/345 |
| 4,326,402 A | * | 4/1982 | Wallis | B21D 45/003 |
| | | | | 72/344 |
| 4,704,890 A | * | 11/1987 | Vrignaud | B21D 37/08 |
| | | | | 72/361 |
| 5,974,852 A | * | 11/1999 | Nieschulz | B21D 45/04 |
| | | | | 267/71 |
| 6,848,290 B2 | * | 2/2005 | Pyper | B21D 35/00 |
| | | | | 72/405.06 |

OTHER PUBLICATIONS

Standard Lifters, Inc., "Stock Guide Application," p. 5, publication date approximately Feb. 1, 2012.

\* cited by examiner

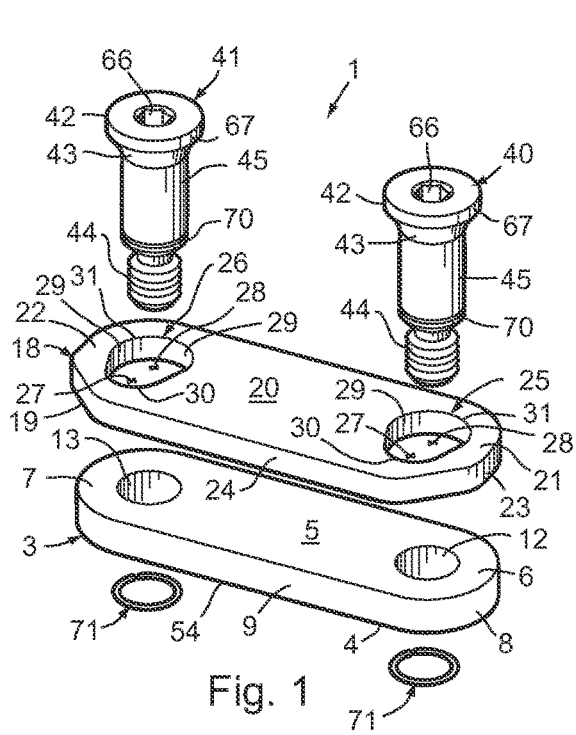

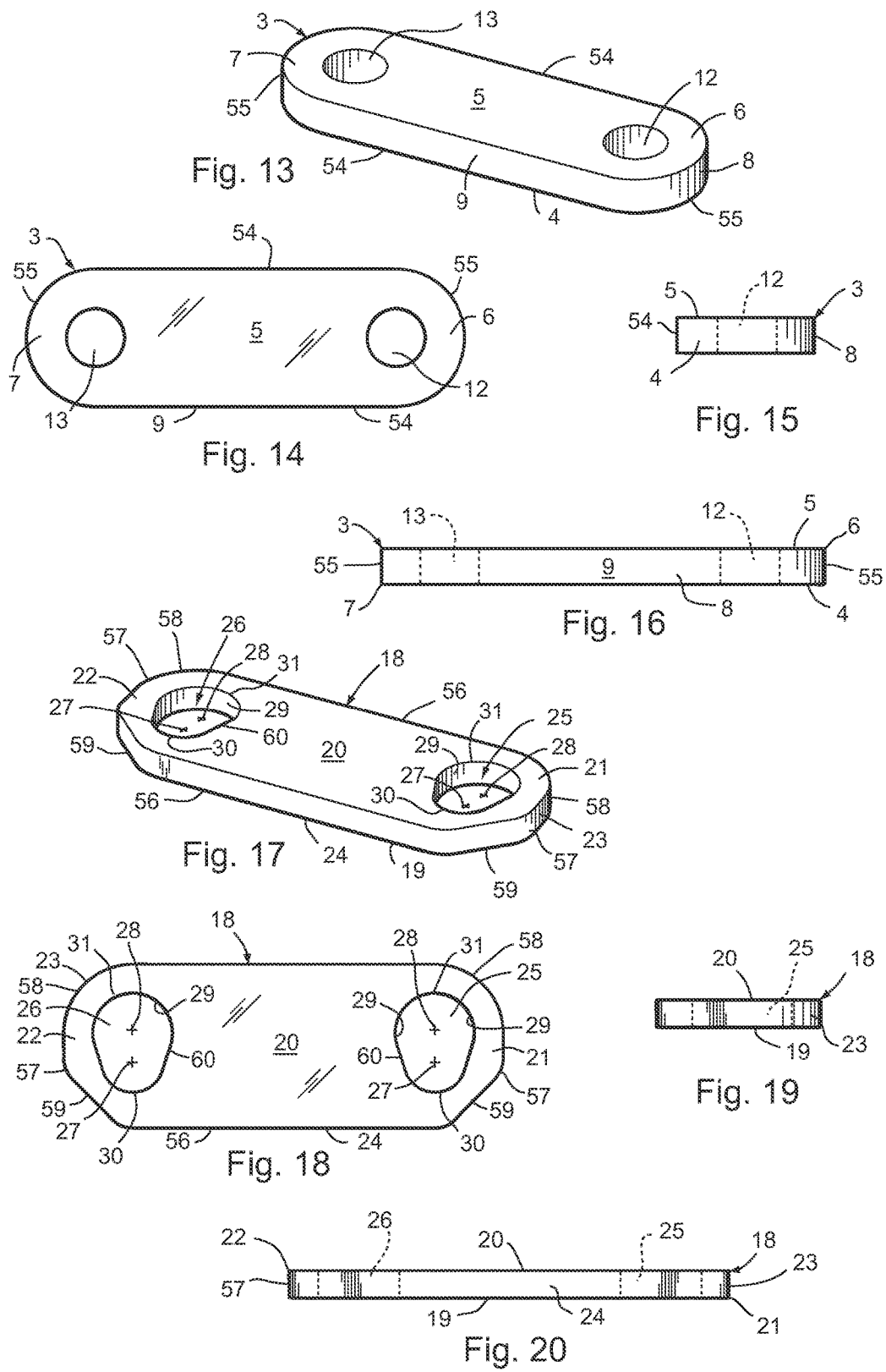

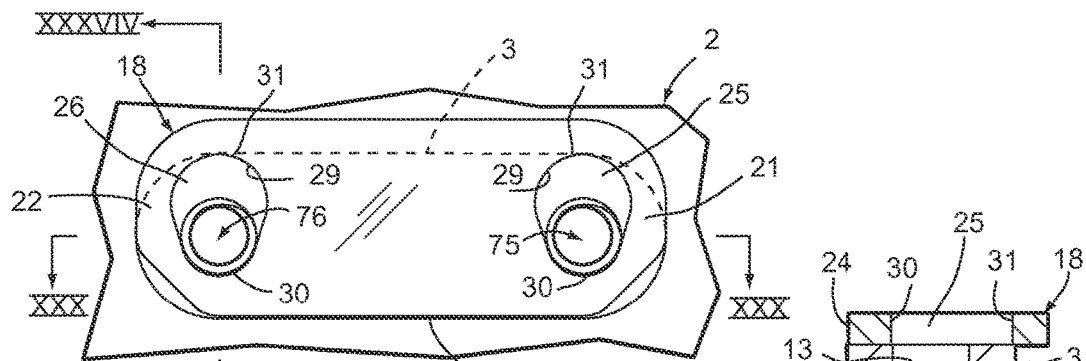
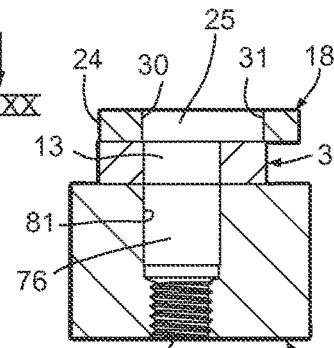
Fig. 28 / Fig. 29
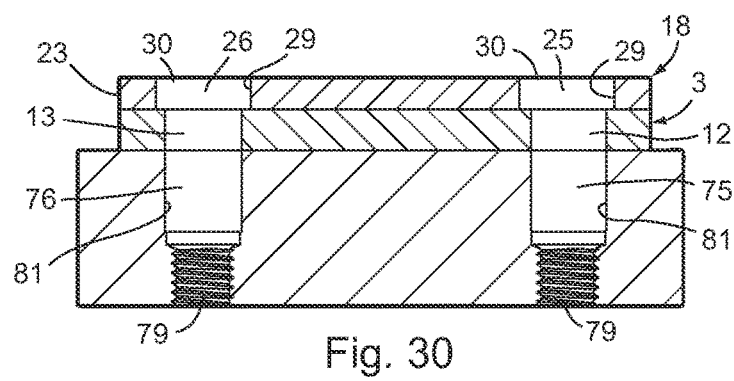
Fig. 30
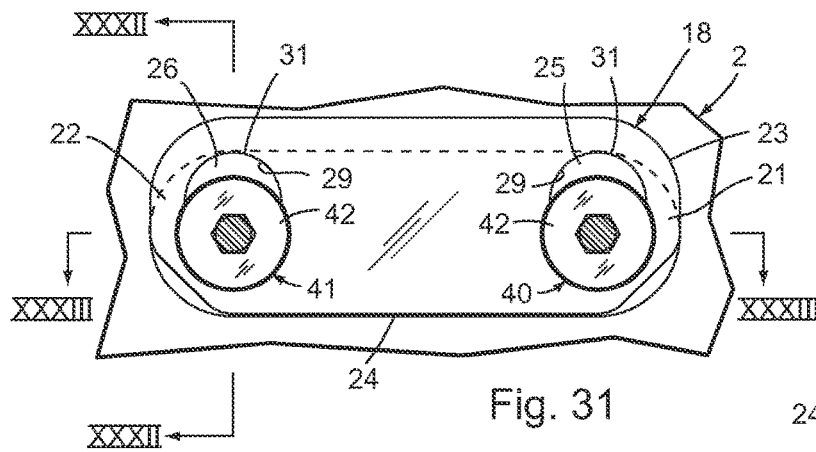
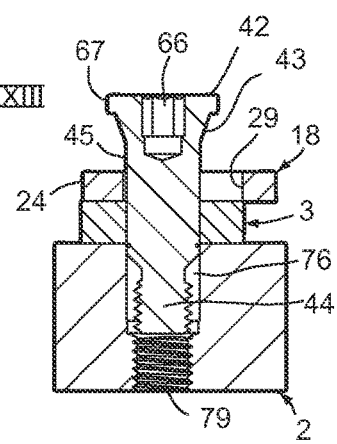
Fig. 31 / Fig. 32
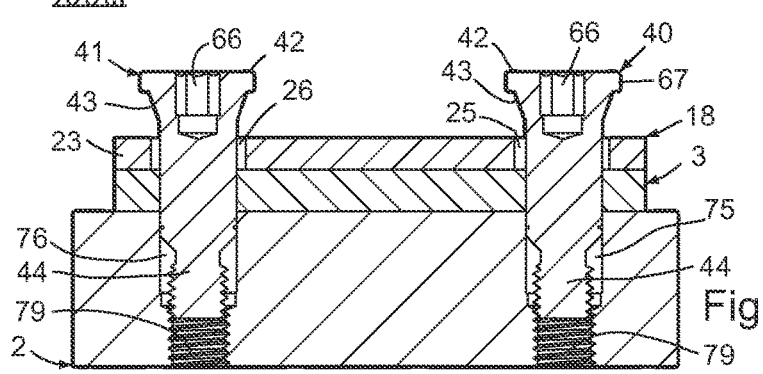
Fig. 33

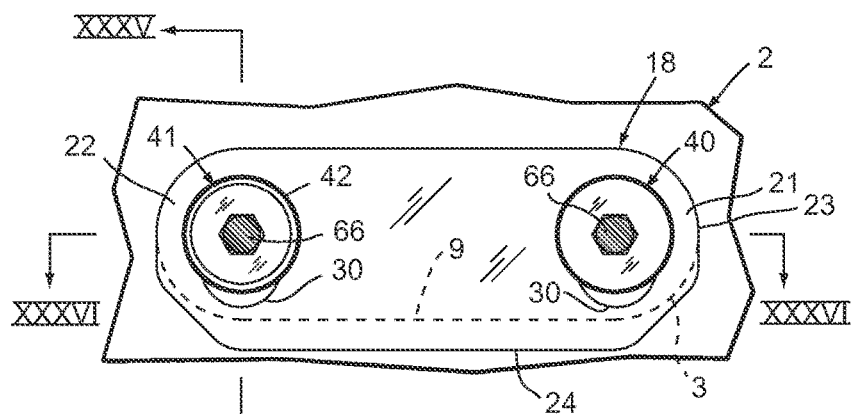
Fig. 34
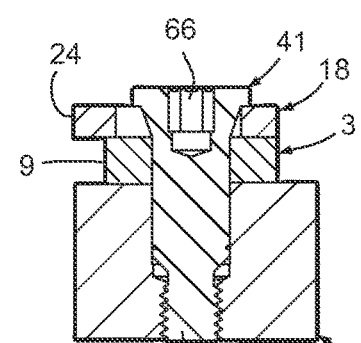
Fig. 35
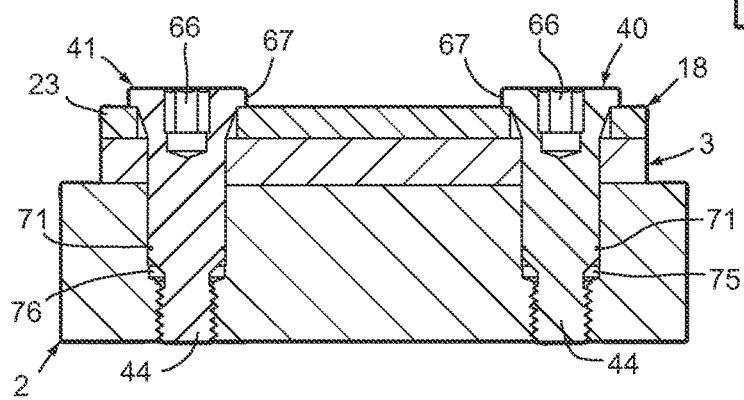
Fig. 36
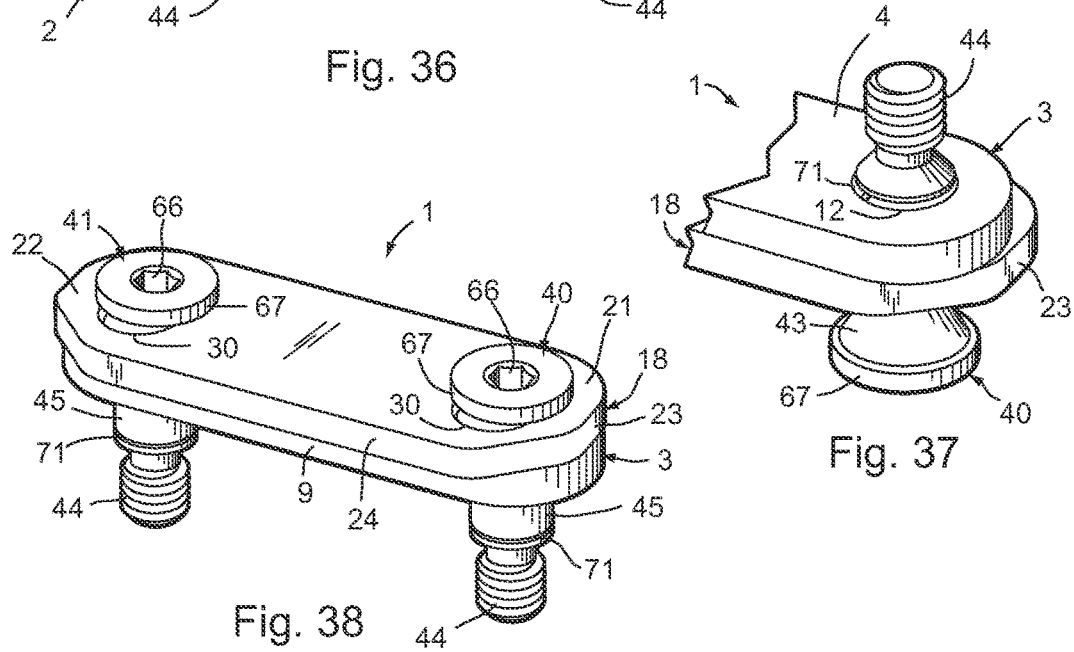
Fig. 37
Fig. 38

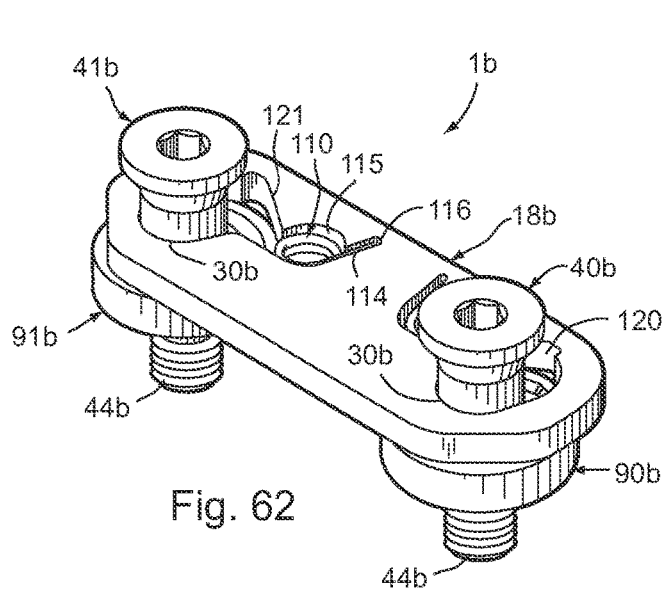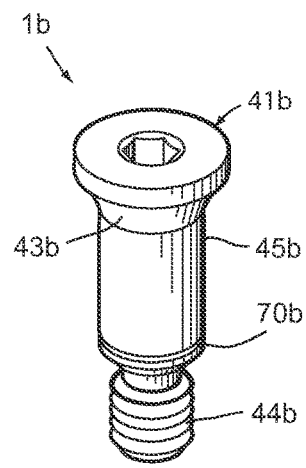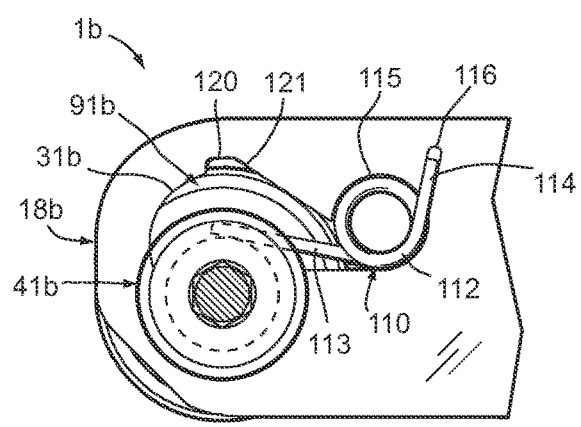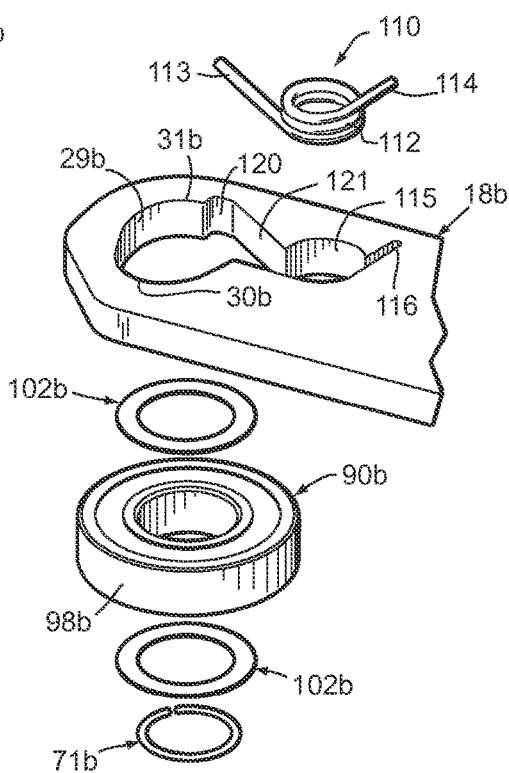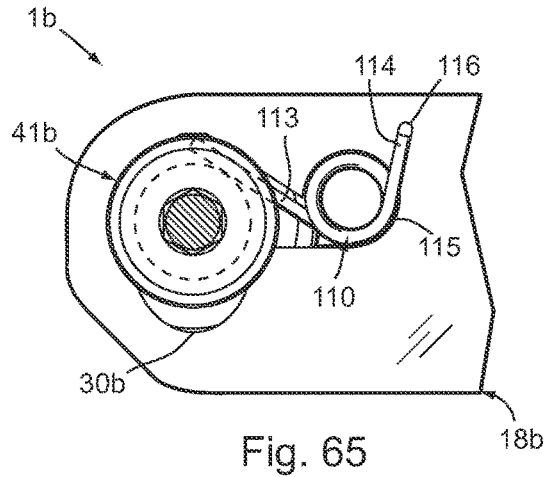

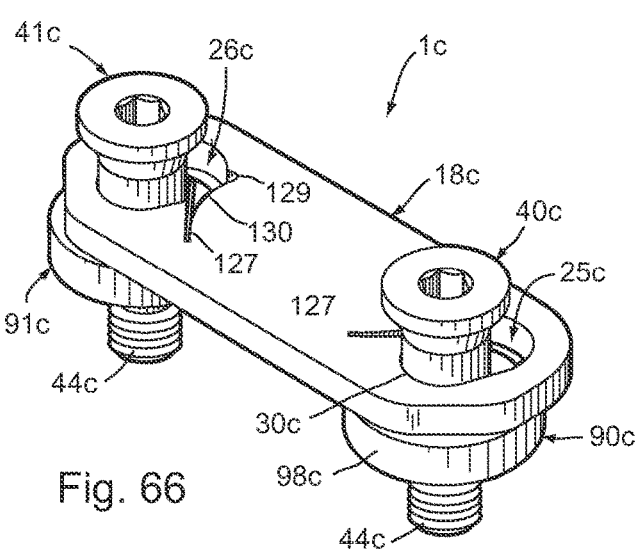
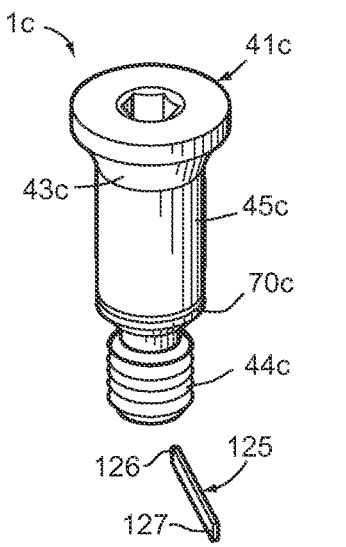
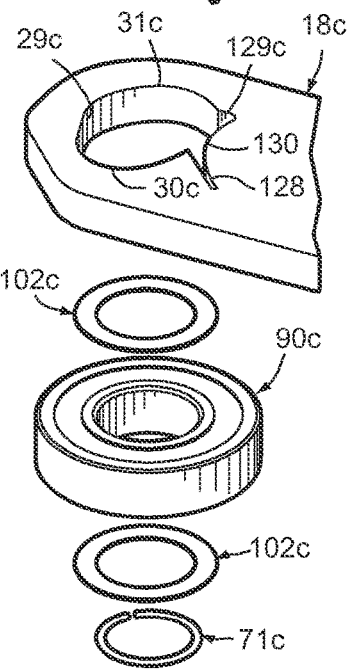
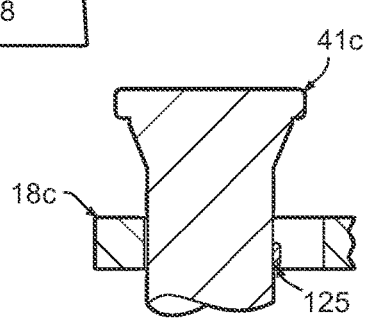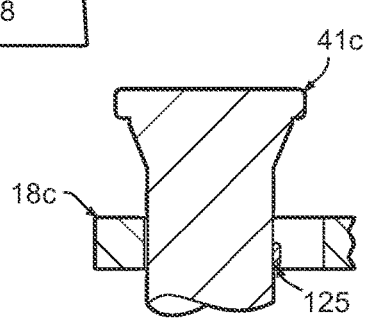
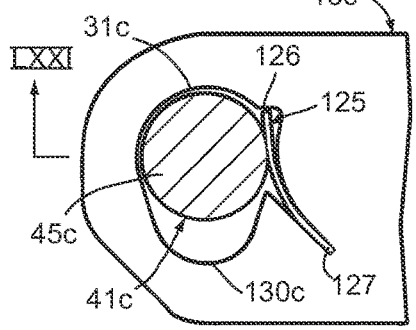
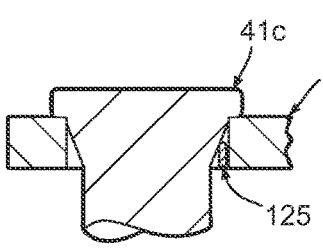

RETRACTABLE STOCK GUIDE AND METHOD FOR METAL FORMING DIES

CROSS REFERENCE TO RELATED APPLICATION AND CLAIM TO PRIORITY

The present application is related to commonly assigned, copending U.S. application Ser. No. 13/713,268, filed Dec. 13, 2012, entitled RETRACTABLE STOCK GUIDE AND METHOD FOR METAL FORMING DIES AND THE LIKE, which is related to U.S. Provisional Patent Application No. 61/587,191, filed Jan. 17, 2012, entitled RETRACTABLE STOCK GUIDE AND METHOD FOR METAL FORMING DIES AND THE LIKE, both of which are incorporated herein by reference, and claims priority thereto under 35 U.S.C. §119.

BACKGROUND OF THE INVENTION

The present invention relates to metal forming dies and the like, and in particular to retractable stock guides and associated methods therefor.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs. Heretofore, the dies used in metal forming presses have typically been individually designed, one of a kind assemblies for a particular part, with each of the various components being hand crafted and custom mounted or fitted in an associated die set, which is in turn positioned in a stamping press. Not only are the punches and the other forming tools in the die set individually designed and constructed, but the other parts of the die set, such as stock lifters, stock guides, end caps and keepers, cam returns, etc. are also custom designed and installed in the die set. Current die making processes require carefully machined, precision holes and recesses in the die set, for mounting the individual components, such that the same are quite labor intensive, and requires substantial lead time to make, test and set up in a stamping press. Consequently, such metal forming dies are very expensive to design, manufacture and repair or modify.

In metal forming machines, a die is typically mounted in a stamping press, and the material to be stamped, which is usually in the form of an elongate strip of metal, is fed into the die with automated feed equipment meant to keep the material flowing straight through the die. A plurality of stock guides create guides along the longitudinal axis of the material to keep it moving in a straight line through the die.

While prior stock guides and methods have proven generally successful, further improvements and enhancements to the same, as well as metal forming dies generally, would be clearly advantageous, and are disclosed herein.

SUMMARY OF THE INVENTION

One aspect of the present invention is an improved metal forming die of the type having at least two mutually converging and diverging die members between which an elongate stock strip is shifted longitudinally to form parts from the stock strip, which includes a retractable stock guide assembly for precisely guiding the stock strip longitudinally along a straight line through the die. First and second retractable stock guides are detachably mounted on a first one of the die members, in a laterally spaced apart, mutually parallel and oppositely facing relationship for guiding the stock strip therebetween. Each retractable stock guide includes a rigid, strap-shaped, stationary guide rail having an inner face operably supported on the one die member, an outer face disposed generally parallel and opposite the inner face, a leading end portion and a trailing end portion disposed opposite the leading end portion of the guide rail and downstream thereof in the direction of stock strip travel. Each guide rail also has a side edge disposed between the inner and outer faces, with a laterally inward guide portion thereof oriented generally perpendicular with the inner and outer faces and configured to slidingly contact an adjacent side edge of the stock strip to precisely guide the same through the die. Each guide rail also has first and second through apertures extending through the inner and outer faces of the guide rail adjacent the leading and trailing end portions thereof respectively, with a generally circular plan shape and a predetermined diameter. Each retractable stock guide also includes a rigid, strap-shaped, retractable guide cap, having an inner face generally overlying and supported by the guide rail, an outer face disposed generally parallel with and opposite the inner face of the guide cap, a leading end portion and a trailing end portion disposed generally opposite the leading end portion of the guide cap and downstream thereof in the direction of stock strip travel. Each guide cap also has a side edge disposed between the inner and outer faces of the guide cap and having a laterally inward cap portion which protrudes laterally inwardly over the inward guide portion of the side edge of the guide rail in an extended run condition to slidingly capture the stock strip between the first and second stock guides and the one die member, and is generally aligned with the inward guide portion of the side edge of the guide rail in a retracted load/unload condition to permit the stock strip to be readily loaded into and removed from inbetween the first and second stock guides. Each retractable guide cap also includes first and second through apertures extending through the inner and outer faces of the guide cap adjacent the leading and trailing end portions thereof, respectively, and each has a laterally oriented, generally ovate plan shape with first and second spaced apart axes of symmetry, and being defined by a generally ovate sidewall having a first arcuate portion which is disposed toward the laterally inward cap portion of the side edge, is centered generally about the first axis of symmetry, and has a diameter generally commensurate with the predetermined diameter of the associated one of the first and second through apertures in the guide rail, and a second arcuate portion which is disposed away from the laterally inward cap portion of the side edge, is centered generally about the second axis of symmetry, generally opposite the first arcuate portion of the ovate side wall, and has a diameter greater than the first arcuate portion of the ovate side wall. The retractable stock guides also include first and second mounting studs, each having an enlarged head portion at one end thereof with a tapered outer side wall having an outside diameter with at least a portion thereof that is generally commensurate with the second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also includes a threaded shank portion at the other end thereof, generally opposite the enlarged head portion, that is shaped for insertion through an associated one of the first and second through apertures in the guide cap, an associated one of the first and second through apertures in the guide rail, and is threadedly anchored in the one die member. Each mounting stud also includes a non-threaded collar portion disposed axially between the enlarged head portion and the threaded shank portion, with a cylindrical shape and an outside diameter substantially commensurate with the associated one of the first and second through holes in the guide rail, and the first arcuate portion of the ovate sidewall of the associated one of the first and second through holes in the guide cap. Tightening of the first and second mounting studs in the first die member engages the tapered head portions of the first and second mounting studs against the ovate sidewalls of the first and second through apertures in the guide cap and shifts the guide cap laterally inwardly to the extended run condition to positively capture the stock strip between the first and second stock guides in the first die member and precisely guide the stock strip longitudinally along a straight line through the die. Loosening of the first and second mounting studs in the first die member facilitates laterally outward shifting of the guide caps to the retracted load/unload condition to permit the stock strip to be readily loaded into and/or removed from inbetween the first and second stock guides.

Another aspect of the present invention is an improved metal forming die having at least two mutually converging and diverging die members between which an elongate stock strip is shifted longitudinally to form parts from the stock strip, which includes a retractable stock guide assembly for precisely guiding the stock strip longitudinally along a straight line through the die. The stock guide assembly includes first and second stock guides detachably mounted on a first one of the die members in a laterally spaced apart, mutually parallel and oppositely facing relationship, for guiding the stock strip therebetween. At least the first stock guide includes a rigid, strap-shaped, stationary guide rail, having an inner face operably supported on the one die member, an outer face disposed generally parallel with and opposite the inner face, a leading end portion, and a trailing end portion disposed generally opposite the leading end portion of the guide rail and downstream thereof in the direction of stock strip travel. The guide rail also includes a side edge disposed between the inner and outer faces and having a laterally inward guide portion thereof oriented generally perpendicular with the inner and outer faces and configured to slidingly contact an adjacent side edge of the stock strip to precisely guide the same through the die. The guide rail also includes first and second through apertures extending through the inner and outer faces of the guide rail adjacent the leading and trailing end portions thereof, respectively, with a generally circular plan shape and a predetermined diameter. The first stock guide also includes a rigid, strap-shaped retractable guide cap, having an inner face generally overlying and operably supported by the guide rail, an outer face disposed generally parallel with and opposite the inner face of the guide cap, a leading end portion, and a trailing end portion disposed generally opposite the leading end portion of the guide cap and downstream thereof in the direction of stock strip travel. The retractable guide cap also includes a side edge disposed between the inner and outer faces of the guide cap with a laterally inward cap portion that protrudes laterally inwardly over the inward guide portion of the side edge of the guide rail in an extended run condition to slidingly capture the stock strip between the first and second stock guides and the one die member, and is generally aligned with the inward guide portion of the side edge of the guide rail in a retracted load/unload condition to permit the stock strip to be readily loaded into and/or removed from inbetween the first and second stock guides. The retractable guide cap also includes first and second through apertures extending through the inner and outer faces of the guide cap adjacent the leading and trailing end portions thereof respectively, and each having a laterally oriented, generally ovate plan shape with first and second spaced apart axes of symmetry, and being defined by a generally ovate sidewall having a first arcuate portion which is disposed toward the laterally inward cap portion of the side edge, is centered generally about the first axis of symmetry, and has a diameter generally commensurate with the predetermined diameter of the associated one of the first and second through apertures in the guide rail, and a second arcuate portion which is disposed away from the laterally inward cap portion of the sidewall, is centered generally about the second axis of symmetry, generally opposite the first arcuate portion, and has a diameter greater than the first arcuate portion of the ovate sidewall. The first stock guide also includes first and second mounting studs each having an enlarged head portion at one end thereof with a tapered outer sidewall having an outside diameter with at least a portion thereof that is generally commensurate with the second arcuate portion of the ovate sidewall of the associated one of the first and second through holes in the guide cap, and is greater than the diameter of the first arcuate portion of the sidewall of the associated one of the first and second through apertures in the guide cap. Each mounting stud also includes a threaded shank portion at the other end thereof, generally opposite the enlarged head portion, that is shaped for insertion through an associated one of the first and second through apertures in the guide cap, an associated one of the first and second through apertures in the guide rail, and is threadedly anchored in the one die member. Each of the mounting studs further includes a non-threaded collar portion disposed axially between the enlarged head portion and the threaded shank portion, and has a cylindrical shape with an outside diameter substantially commensurate with the associated one of the first and second through holes in the guide rail, and the first arcuate portion of the ovate sidewall of the associated one of the first and second through holes in the guide cap. Tightening of the first and second mounting studs in the first die member engages the tapered head portions of the first and second mounting studs against the ovate sidewalls of the first and second through apertures in the guide cap, and shifts the guide cap laterally inwardly to the extended run condition to positively capture the stock strip between the first and second stock guides and the first die member, and precisely guide the stock strip longitudinally along a straight line through the die. Loosening of the first and second mounting studs in the first die member facilitates laterally outward shifting of the guide cap to the retracted load/unload condition to permit the stock strip to be readily loaded into and/or removed from inbetween the first and second stock guides.

Yet another aspect of the present invention is a retractable stock guide assembly for a metal forming die having at least two mutually converging and diverging die members between which an elongated stock strip is shifted longitudinally to form parts from the stock strip. The retractable stock guide assembly includes at least one retractable stock guide configured for detachably mounting on a first one of the die members and includes a rigid, strap-shaped, stationary guide rail having an inner face shaped for operably support on the one die member, an outer face disposed generally parallel with and opposite the inner face, a leading end portion and a trailing end portion disposed generally opposite the leading end portion of the guide rail and downstream thereof in the direction of stock strip travel. The guide rail also includes a side edge disposed between the inner and outer faces thereof, with a laterally inward guide portion thereof oriented generally perpendicular with the inner and outer faces and configured to slidingly contact an adjacent side edge of the stock strip to precisely guide the same through the die. The guide rail also has first and second through apertures extending through the inner and outer faces of the guide rail adjacent the leading and trailing end portions, respectively, each having a generally circular plan shape with a predetermined diameter. The stock guide also includes a rigid strap-shaped retractable guide cap, having an inner face generally overlying and operably supported by the outer face of the guide rail, an outer face disposed generally parallel with and opposite the inner face of the guide cap, a leading end portion and a trailing end portion disposed generally opposite the leading end portion of the guide cap and downstream thereof in the direction of stock strip travel. The guide cap also includes a side edge disposed between the inner and outer faces of the guide cap, with a laterally inward cap portion which protrudes laterally inwardly over the inward guide portion of the side edge of the guide rail in an extended run condition to slidingly capture at least a portion of a stock strip between the stock guide and the one die member, and is generally aligned with the inward guide portion of the side edge of the guide rail in a retracted load/unload condition to permit at least a portion of the stock strip to be readily loaded into and/or removed from the stock guide. The guide cap also includes first and second through apertures extending through the inner and outer faces of the guide cap adjacent the leading and trailing end portions thereof, respectively, with each having a laterally oriented generally ovate plan shape with first and second spaced apart axes of symmetry, and being defined by a generally ovate sidewall having a first arcuate portion which is disposed toward the laterally inward cap portion of the side edge, is centered generally about the first axis of symmetry, and has a diameter generally commensurate with the predetermined diameter of the associated one of the first and second through apertures in the guide rail, and a second arcuate portion which is disposed away from the laterally inward cap portion of the side edge, is centered generally about the second axis of symmetry, generally opposite the first arcuate portion of the ovate sidewall, and has a diameter greater than the first arcuate portion of the ovate sidewall. The stock guide also includes first and second mounting studs, each having an enlarged head portion at one end thereof, with a tapered outer sidewall having an outside diameter with at least a portion thereof that is generally commensurate with the second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also has a threaded shank portion at the other end thereof, generally opposite the enlarged head portion, that is shaped for insertion through an associated one of the first and second through apertures in the guide cap, an associated one of the first and second through apertures in the guide rail, and is threadedly anchored in the one die member. Each mounting stud also has a non-threaded collar portion disposed axially between the enlarged head portion and the threaded shank portion, and has a cylindrical shape with an outside diameter substantially commensurate with the associated one of the first and second through holes in the guide rail, and the first arcuate portion of the ovate sidewall of the associated one of the first and second through holes in the guide cap. Tightening of the first and second mounting studs in the first die member engages the tapered head portions of the first and second mounting studs against the ovate sidewalls of the first and second through apertures in the guide cap, and shifts the guide cap laterally inwardly to the extended run condition to positively capture at least a portion of the stock strip between the stock guide assembly and the first die member, and precisely guide the stock strip longitudinally along the straight line through the die. Loosening of the first and second mounting studs in the first die member facilitates laterally outward shifting of the guide cap to the retracted load/unload condition to permit the stock strip to be readily loaded into and/or removed from the stock guide.

Yet another aspect of the present invention is an improved metal forming die having at least two mutually converging and diverging die members between which an elongate stock strip is shifted longitudinally to form parts from the stock strip, which includes a retractable stock guide assembly for precisely guiding the stock strip longitudinally along a straight line through the die. The retractable stock guide assembly includes first and second stock guides detachably mounted on a first one of the die members in a laterally spaced apart, mutually parallel and oppositely facing relationship for guiding the stock strip therebetween. Each of the first and second stock guides includes first and second guide rollers, each of which has a generally circular plan configuration with an inner face shaped for operable support on the one die member and an outer face disposed generally parallel with and opposite the inner face, as well as a generally annularly shaped inner bearing race, a generally annularly shaped outer bearing race, and a plurality of roller bearing elements captured between the inner and outer bearing races which facilitate smooth, anti-frictional rotation of the outer bearing race relative to the inner bearing race. The inner bearing race has an innermost mounting sidewall with a circular plan shape and an associated predetermined diameter, and the outer bearing race has an outermost stock guiding sidewall with a circular plan shape and an associated predetermined diameter, which is configured to rollingly contact an adjacent side edge of the stock strip to precisely guide the same through the die. Each stock guide also includes a rigid strap-shaped retractable guide cap, having an inner face generally overlying and operably supported by the outer faces of the guide rollers, an outer face disposed generally parallel with and opposite the inner face of the guide cap, a leading end portion, and a trailing end portion disposed generally opposite the leading end portion of the guide cap and downstream thereof, in the direction of stock strip travel. Each guide cap also includes a side edge disposed between the inner and outer faces of the guide cap, with a laterally inward cap portion which protrudes laterally inwardly over the outermost stock guiding sidewalls of the first and second guide rollers in an extended run condition to rollingly capture the stock strip between the first and second stock guides and the one die member, and is generally aligned with the outermost stock guiding sidewalls of the first and second guide rollers in a retracted load/unload condition to permit the stock strip to be readily loaded into and/or removed from between the first and second stock guides. Each guide cap also includes first and second through apertures extending through the inner and outer faces of the guide cap adjacent the inner end trailing end portions thereof, respectively, with each having a laterally oriented, generally ovate plan shape with first and second spaced apart axes of symmetry, and being defined by a generally ovate sidewall having a first arcuate portion which is disposed toward the laterally inward cap portion of the side edge, is centered generally about the first axis of symmetry and has a diameter generally commensurate with the predetermined diameter of the associated one of the first and second innermost mounting sidewalls of the first and second guide rollers, and a second arcuate portion which is disposed away from the laterally inward cap portion of the side edge, is centered generally about the second axis of symmetry, generally opposite the first arcuate portion of the ovate sidewall, and has a diameter greater than the first arcuate portion of the ovate sidewall. Each of the stock guides also includes first and second mounting studs, each having an enlarged head portion at one end thereof with a tapered outer sidewall, having an outside diameter with at least a portion thereof that is generally commensurate with the second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also includes a threaded shank portion at the other end thereof, generally opposite the enlarged head portion, and shaped for insertion through an associated one of the first and second through apertures in the guide cap, an associated one of the innermost mounting sidewalls of the first and second guide rollers, and being threadedly anchored in the one die member. Each mounting stud also includes a non-threaded collar portion disposed axially between the enlarged head portion and the threaded shank portion, and having a cylindrical shape with an outside diameter substantially commensurate with the associated one of the innermost mounting sidewalls of the first and second guide rollers, and the first arcuate portion of the ovate sidewall of the associated one of the first and second through holes in the guide cap. Tightening of the first and second mounting studs in the first die member engages the tapered head portions of the first and second mounting studs against the ovate sidewalls of the first and second through apertures in the guide caps, and shifts the guide caps laterally inwardly to the extended run condition to positively capture the stock strip between the first and second stock guides and the first die member, and precisely guide the stock strip longitudinally along the straight line through the die. Loosening of the first and second mounting screws in the first die member facilitates laterally outward shifting of the guide caps to the retracted load/unload condition to permit the stock strip to be readily loaded into and/or removed in between the first and second stock guides.

Yet another aspect of the present invention is an improved metal forming die having at least two mutually converging and diverging die members between which an elongate stock strip is shifted longitudinally to form parts from the stock strip, which includes a retractable stock guide assembly for precisely guiding the stock strip longitudinally along a straight line through the die, which includes first and second stock guides detachably mounted on a first one of the die members in a laterally spaced apart, mutually parallel and oppositely facing relationship for guiding the stock strip therebetween. At least the first one of the stock guides includes first and second guide rollers, each having a generally circular plan configuration with an inner face shaped for operable support on the one die member and an outer face disposed generally parallel with and opposite the inner face, a generally annularly shaped inner bearing race, a generally annularly shaped outer bearing race, and the plurality of rolling bearing elements captured between the inner and outer bearing races which facilitates smooth, anti-frictional rotation of the outer bearing race relative to the inner bearing race. The inner bearing race has an innermost mounting sidewall with a circular plan shape and an associated predetermined diameter, and the outer bearing race has an outermost stock guiding sidewall, with a circular plan shape and an associated predetermined diameter, which is configured to rollingly contact an adjacent side edge of the stock strip to precisely guide the same through the die. The first stock guide also includes a rigid, strap-shaped retractable guide cap, having an inner face generally overlying and operably supported by the outer faces of the guide rollers, an outer face disposed generally parallel with and opposite the inner face of the guide cap, a leading end portion and a trailing end portion disposed generally opposite the leading end portion of the guide cap and downstream thereof in the direction of stock strip travel. The guide cap also includes a side edge disposed between the inner and outer faces of the guide cap, with a laterally inward cap portion which protrudes laterally inwardly over the outermost stock guiding sidewalls of the first and second guide rollers in an extended run condition to rollingly capture the stock strip between the first and second stock guides and the one die member, and is generally aligned with the outermost stock guiding sidewalls of the first and second guide rollers in a retracted load/unload condition to permit the stock strip to be readily loaded into and/or removed from inbetween the first and second stock guides. The guide cap also has first and second through apertures extending through the inner and outer faces of the guide cap adjacent the leading and trailing end portions thereof, respectively, and each has a laterally oriented, generally ovate plan shape with first and second spaced apart axes of symmetry, and being defined by a generally ovate sidewall having a first arcuate portion which is disposed toward the laterally inward cap portion of the side edge, is centered generally about the first axis of symmetry, and has a diameter generally commensurate with the predetermined diameter of the associated one of the first and second innermost mounting sidewalls of the first and second guide rollers, and a second arcuate portion which is disposed away from the laterally inward cap portion of the side edge, is centered generally about the second axis of symmetry, generally opposite the first arcuate portion of the ovate sidewall, and has a diameter greater than the first arcuate portion of the ovate sidewall. The first stock guide also includes first and second mounting studs, each of which has an enlarged head portion at one end thereof with a tapered outer sidewall having an outside diameter with at least a portion thereof that is generally commensurate with the second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also includes a threaded shank portion at the other end thereof, generally opposite the enlarged head portion, that is shaped for insertion through an associated one of the first and second through apertures in the guide cap, an associated one of the innermost mounting sidewalls of the first and second guide rollers, and is threadedly anchored in the one die member. Each mounting stud also includes a non-threaded collar portion disposed axially between the enlarged head portion and the threaded shank portion, and has a cylindrical shape with an outside diameter substantially commensurate with the associated one of the innermost mounting sidewalls of the first and second guide rollers, and the first arcuate portion of the ovate sidewall of the associated one of the first and second through holes in the guide cap. Tightening of the first and second mounting studs in the first die member engages the tapered head portions of the first and second mounting studs against the ovate sidewall of the first and second through apertures in the guide cap and shifts the guide cap laterally inwardly to the extended run condition to positively capture the stock strip between the first and second stock guides and the first die member and precisely guide the stock strip longitudinally along a straight line through the die. Loosening of the first and second mounting studs in the first die member facilitates laterally outward shifting of the guide cap to the retracted load/unload condition to permit the stock strip to be readily loaded into and/or removed from inbetween the first and second stock guides.

Yet another aspect of the present invention is a retractable stock guide assembly for a metal forming die having at least two mutually converging and diverging die members between which an elongate stock strip is shifted longitudinally to form parts from the stock strip. The retractable stock guide assembly includes at least one retractable stock guide configured for detachably mounting on a first one of the die members and includes first and second guide rollers, each having a generally circular plan configuration with an inner face shaped for operable support on the one die member and an outer face disposed generally parallel with and opposite the inner face, a generally annularly shaped inner bearing race, a generally annularly shaped outer bearing race, and a plurality of rolling bearing elements captured between the inner and outer bearing races, which facilitates smooth, anti-frictional rotation of the outer bearing race relative to the inner bearing race. The inner bearing race has an innermost mounting sidewall with a circular plan shape and an associated predetermined diameter, and the outer bearing race has an outermost stock guiding sidewall with a circular plan shape and an associated predetermined diameter, and is configured to rollingly contact an adjacent side edge of the stock strip to precisely guide the same through the die. The stock guide also includes a rigid strap-shaped retractable guide cap having an inner face generally overlying and operably supported by the outer faces of the guide rollers, an outer face disposed generally parallel with and opposite the inner face of the guide cap, a leading end portion and a trailing end portion disposed generally opposite the leading end portion of the guide cap and down-stream thereof in the direction of stock strip travel. The guide cap also includes a side edge disposed between the inner and outer faces of the guide cap with a laterally inward cap portion which protrudes laterally inwardly over the outermost stock guiding sidewalls of the first and second guide rollers in an extended run condition to rollingly capture at least a portion of the stock strip between the stock guide and the one die member, and is generally aligned with the outermost stock guiding sidewalls of the first and second guide rollers in a retracted load/unload condition to permit at least a portion of the stock strip to be readily loaded into and/or removed from the stock guide. The guide cap also includes first and second through apertures extending through the inner and outer faces of the guide cap adjacent the leading and trailing end portion thereof, respectively, with each having a laterally oriented, generally ovate plan shape with first and second spaced apart axes of symmetry, and being defined by a generally ovate sidewall having a first arcuate portion which is disposed toward the laterally inward cap portion of the side edge, is centered generally about the first axis of symmetry, and has a diameter generally commensurate with the predetermined diameter of the associated one of the first and second innermost mounting sidewalls of the first and second guide rollers, and a second arcuate portion which is disposed away from the laterally inward cap portion of the side edge, is centered generally about the second axis of symmetry, generally opposite the first arcuate portion of the ovate sidewall, and has a diameter greater than the first arcuate portion of the ovate sidewall. The stock guide also has first and second mounting studs, each of which has an enlarged head portion at one end thereof, with a tapered outer sidewall having an outside diameter with at least a portion thereof that is commensurate with the second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also has a threaded shank portion at the other end thereof, generally opposite the enlarged head portion, that is shaped for insertion through an associated one of the first and second through apertures in the guide cap, an associated one of the innermost mounting sidewalls of the first and second guide rollers, and is threadedly anchored in the first die member. Each mounting stud also includes a non-threaded collar portion disposed axially between the enlarged head portion and the threaded shank portion and has a cylindrical shape with an outside diameter substantially commensurate with the associated one of the innermost mounting sidewalls of the first and second guide rollers, and the first arcuate portion of the ovate sidewall of the associated one of the first and second through holes in the guide cap. Tightening of the first and second mounting studs in the first die member engages the tapered head portions of the first and second mounting studs against the ovate sidewalls of the first and second through apertures in the guide cap, and shifts the guide cap laterally inwardly to the extended run condition to positively capture at least a portion of the stock strip between the stock guide and the first die member, and precisely guide the stock strip longitudinally along a straight line through the die. Loosening of the first and second mounting studs in the first die member facilitates laterally outward shifting of the guide cap to the retracted load/unload condition to permit at least a portion of the stock strip to be readily loaded into and/or removed from the stock guide.

Yet another aspect of the present invention is an improved method for making a metal forming die of the type having at least two mutually converging and diverging die members between which an elongate stock strip is shifted longitudinally to form parts from the stock strip. The method includes forming a rigid strap-shaped stationary guide rail with an inner face for operable support on the one die member, an outer face disposed generally parallel with and opposite the inner face, a leading end portion, a trailing end portion disposed generally opposite the leading end portion of the guide rail and down the stream thereof in the direction of stock strip travel, and a side edge disposed between the inner and outer faces with a laterally inward guide portion thereof oriented generally perpendicular with the inner and outer faces and configured to slidingly contact an adjacent side edge of the stock strip to precisely guide the same through the die. The method further includes forming first and second through apertures through the inner and outer faces of the guide rail adjacent the leading and trailing end portions thereof, respectively, each with a generally circular plan shape and a predetermined diameter. The method further includes forming a rigid strap-shaped retractable guide cap with an inner face generally overlying and operably supported by the guide rail, an outer face disposed generally parallel with and opposite the inner face of the guide cap, a leading end portion and a trailing end portion disposed generally opposite the leading end portion of the guide cap and downstream thereof in the direction of stock strip travel, and a side edge disposed between the inner and outer faces of the guide cap with a laterally inward cap portion which protrudes laterally inwardly over the inward guide portion of the side portion of the guide rail in an extended running condition, and is aligned with the inward guide portion of the side edge of the guide rail in a retracted load/unload condition. The method further includes forming first and second through apertures through the inner and outer faces of the guide cap adjacent the leading and trailing end portions thereof, respectively, each with a laterally oriented, generally ovate plan shape with first and second spaced apart axes of symmetry and being defined by a generally ovate sidewall with a first arcuate portion which is disposed toward the laterally inward cap portion of the side edge, is centered generally about the first axis of symmetry, and has a diameter generally commensurate with the predetermined diameter of the associated one of the first and second through apertures in the guide rail, and a second arcuate portion which is disposed away from the laterally inward cap portion of the side edge, is centered generally about the second axis of symmetry, generally opposite the first arcuate portion of the ovate sidewall, and has a diameter that is greater than the first arcuate portion of the ovate sidewall. The method further includes forming a plurality of mounting studs, each with an enlarged head portion at one end thereof with a tapered sidewall having an outside diameter with at least a portion thereof that is generally commensurate with the second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also has a threaded shank portion at the other end thereof, generally opposite the enlarged head portion, that is shaped for insertion through an associated one of the first and second through apertures in the guide cap, and an associated one of the first and second through apertures in the guide rail, and for threaded anchoring in the one die member. Each mounting stud also has a non-threaded collar portion disposed axially between the enlarged head portion and the threaded shank portion and has a cylindrical shape with an outside diameter substantially commensurate with the associated one of the first and second through holes in the guide rail, and the first arcuate portion of the ovate sidewall of the associated one of the first and second holes in the guide cap. The method further includes forming first and second at least partially threaded mounting apertures in a mounting face of the one die member, in a mutually aligned and spaced apart relationship configured for securely, yet detachably mounting a first one of the retractable stock guide assemblies thereon. The method further includes forming third and fourth at least partially threaded mounting apertures in the mounting face of the one die member in a mutually aligned and spaced apart relationship, which are disposed laterally spaced apart from and generally parallel with the first and second mounting apertures, and configured for securely, yet detachably mounting a second one of the retractable stock guide assemblies thereon in an oppositely facing relationship with the first one of the retractable stock guide assemblies. The method further includes positioning a first stationary guide rail on the mounting surface of the one die member with the first and second through apertures thereof generally aligned with the first and second mounting apertures in the one die member, and positioning a second stationary guide rail on the mounting surface of the one die member with the first and second through apertures thereof generally aligned with the third and fourth mounting apertures in the one die member. The method further includes positioning a first retractable guide cap above the first stationary guide rail with the first and second through apertures of the first retractable guide cap generally aligned with the first and second through apertures in the first stationary guide rail, and positioning a second retractable guide cap above the second stationary guide rail with the first and second through apertures of the second retractable guide cap generally aligned with the first and second through apertures in the second stationary guide rail. The method further includes inserting the threaded ends of first and second ones of the threaded mounting studs into and through the first and second through apertures in both the first stationary guide rail and the first retractable guide cap, and then into the first and second mounting apertures in the one die member, and partially tightening the first and second mounting studs in the first and second mounting apertures in the one die member, so as to permit shifting of the first retractable guide cap between the extended run condition and the retracted load/unload condition. The method further includes inserting the threaded ends of third and fourth ones of the threaded mounting screws into and through the first and second through apertures in both the second stationary guide rail and the second retractable guide cap and then into the third and fourth mounting apertures in the one die member, and partially tightening the third and fourth mounting studs in the third and fourth mounting apertures in the one die member, so as to permit shifting of the second retractable guide cap between the extended run condition and the retracted load/unload condition. The method further includes shifting both the first and second retractable guide caps to the retracted load/unload condition, and inserting an elongate stock strip between the first and second stationary stock guides, and onto the mounting surface of the one die member. The method further includes tightening the first, second, third and fourth mounting studs in the one die member, thereby engaging the tapered head portions of the first, second, third and fourth mounting studs against the ovate sidewalls of the first and second through apertures in the first and second guide caps, and thereby shifting the first and second guide caps laterally inwardly to the extended run condition to positively capture the stock strip between first and second retractable stock guide assemblies and the one die member, and precisely guide the stock strip longitudinally along the straight line through the die.

Yet another aspect of the present invention is an improved method for making a metal forming die of the type having at least two mutually converging and diverging die members between which an elongate stock strip is shifted longitudinally to form parts from the stock strip using a retractable stock guide assembly for precisely guiding the stock strip longitudinally along a straight line through the die. The method includes forming first and second guide rollers each with a generally circular plan configuration with an inner face operably supported on the one die member, and an outer face disposed generally parallel with and opposite the inner face, a generally annularly inner bearing race, a generally annularly shaped outer bearing race and a plurality of rolling bearing elements captured between the inner and outer bearing races which facilitates smooth, anti-frictional rotation of the outer bearing race relative to the inner bearing race. The inner bearing race has an innermost mounting sidewall with a circular plan shape and an associated predetermined diameter, and the outer bearing race has an outermost stock guiding sidewall with a circular plan shape and an associated predetermined diameter which is configured to rollingly contact an adjacent side edge of the side strip to precisely guide the same through the die. The method further includes forming a rigid, strap-shaped retractable guide cap with an inner face generally overlying and operably supported by the outer faces of the guide rollers, an outer face disposed generally parallel with and opposite the inner face of the guide cap, a leading end portion, and a trailing end portion disposed generally opposite the leading end portion of the guide cap and downstream thereof in the direction of stock strip travel. The guide cap also has a side edge disposed between the inner and outer faces of the guide cap, with a laterally inward cap portion which protrudes laterally inwardly over the outermost stock guiding sidewalls of the first and second guide rollers in an extended run condition, and is generally aligned with the outermost stock guiding sidewalls of the first and second guide rollers in a retracted load/unload condition. The method further includes forming first and second through apertures through the inner and outer faces of the guide cap, adjacent the leading and trailing end portions thereof, each with a laterally oriented, generally ovate plan shape with first and second spaced apart axes of symmetry, and being defined by a generally ovate sidewall with a first arcuate portion which is disposed toward the laterally inward cap portion of the side edge, is centered generally about the first axis of symmetry and has a diameter generally commensurate with the predetermined diameter of the associated one of the innermost mounting sidewalls in the first and second guide rollers, and a second arcuate portion which is disposed away from the laterally inward cap portion of the side edge, is centered generally about the second axis of symmetry, generally opposite the first arcuate portion of the ovate sidewall, and has a diameter greater than the first arcuate portion of the ovate sidewall. The method further includes forming a plurality of mounting studs, each with an enlarged head portion at one end thereof, with a tapered outer sidewall having an outside diameter with at least a portion thereof that is generally commensurate with a second arcuate portion of the ovate sidewall of the associated one of the first and second through holes in the guide cap, and is greater than the diameter of the first arcuate portion of the ovate sidewall of the associated one of the first and second through apertures in the guide cap. Each mounting stud also has a threaded shank portion at the other end thereof, generally opposite the enlarged head portion, and shaped for insertion through an associated one of the first and second through apertures in the guide cap, and an associated one of the inner mounting sidewalls in the first and second guide rollers, and for threaded anchoring in the one die member. Each mounting stud also has a non-threaded collar portion disposed axially between the enlarged head portion and the threaded shank portion with a cylindrical shape and an outside diameter substantially commensurate with the associated one of the inner mounting sidewalls of the first and second guide rollers, and the first arcuate portion of the ovate sidewall of the associated one of the first and second through holes in the guide cap. The method further includes forming first and second at least partially threaded mounting apertures in a mounting face of the one die member in a mutually aligned and spaced apart relationship configured for securely, yet detachably mounting a first one of the retractable stock guide assemblies thereon. The method further includes forming third and fourth at least partially threaded mounting apertures in the mounting face of the one die member in a mutually aligned and spaced apart relationship, which are disposed laterally spaced apart from and generally parallel with first and second mounting apertures, and configured for securely, yet detachably mounting of a second one of the retractable stock guides thereon in an oppositely facing relationship with the first one of the retractable stock guide assemblies. The method further includes positioning a first pair of the first and second guide rollers on the mounting surface of the one die member with the inner mounting sidewalls thereof generally aligned with the first and second mounting apertures in the one die member, and positioning a second pair of the first and second guide rollers on the mounting surface of the one die member with inner mounting sidewalls thereof generally aligned with the third and fourth mounting apertures in the one die member. The method further includes positioning a first retractable guide cap above the first pair of first and second guide rollers with the first and second through apertures of the first retractable guide generally aligned with the inner mounting sidewalls of the first pair of first and second guide rollers, and positioning a second retractable guide cap above the second pair of first and second roller guides with the first and second through apertures of the second retractable guide cap generally aligned with the inner mounting sidewalls of the second pair of first and second roller guides. The method further includes inserting the threaded ends of first and second ones of the threaded mounting studs into and through the first and second through apertures in the first retractable guide cap, the inner mounting sidewalls of the first pair of first and second guide rollers, and then into the first and second mounting apertures in the one die member, and partially tightening the first and second mounting studs in the first and second mounting apertures in the one die member, so as to permit shifting of the first retractable guide cap between the extended run condition and the retracted load/unload condition. The method further includes inserting the threaded ends of third and fourth ones of the threaded mounting studs into and through the first and second through apertures in the second retractable guide cap, the inner mounting sidewalls in the second pair of first and second guide rollers, and then into the third and fourth mounting apertures in the one die member, and partially tightening the third and fourth mounting studs in the third and fourth mounting apertures in the one die member, so as to permit shifting of the second retractable guide cap between the extended run condition and the retracted load/unload condition. The method further includes shifting both the first and second retractable guide caps laterally outwardly to the retracted load/unload condition, and inserting an elongate stock strip between the first and second guide rollers, and onto the mounting surface of the one die member. The method further includes tightening the first, second, third and fourth mounting studs in the one die member, thereby engaging the tapered head portions of the first, second, third and fourth mounting studs against the ovate sidewalls of the first and second through apertures in the first and second guide caps and shifting the guide caps laterally inwardly to the extended run condition to positively capture the stock strip between the first and second retractable stock guide assemblies and the one die member, so as to precisely guide the stock strip longitudinally along a straight line through the die.

Yet another aspect of the present invention is a retractable stock guide assembly and method which has a readily shiftable guide cap to provide quick and easy removal of stock from the tool, as well as quick and easy loading of stock into the tool. The retractable stock guide assembly has a unique design that positively drives the shiftable guide cap into place when the mounting studs are tightened in the tool, thereby ensuring that the guide cap is in its proper position. The retractable stock guide is configured so that the mounting studs do not have to be removed from the tool in order to retract the top guide cap. The retractable stock guide assembly can be used with either a solid, stationary stock guide, or a pair of roller guides, in conjunction with common guide caps and mounting studs that can be used with both designs. The retractable stock guide assembly can be equipped with C-rings, which assures that the various parts remain loosely assembled, and together, even when the stock guide is not mounted on an associated die member, so as to provide a ready to use, all-in-one assembly. The retractable stock guide assembly requires no specialized tooling for installation. The machining of the die member is simple, and can be readily and quickly achieved. The retractable stock guide design can be manufactured in multiple sizes and lengths to accommodate a wide variety of different applications, is economical to manufacture, efficient in use, and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is an exploded, perspective view of a retractable stock guide embodying the present invention.

FIG. 2 is a perspective view of the retractable stock guide, shown attached to an associated die member, and with a retractable guide cap portion thereof in an extended run condition, wherein portions thereof have been broken away to reveal internal construction.

FIG. 3 is a fragmentary, top plan view of the retractable stock guide shown in FIG. 2, with a section of stock strip retained by the retractable stock guide in the extended run condition.

FIG. 4 is a vertical cross-sectional view of the retractable stock guide and stock strip shown in FIG. 3, taken along the line IV-IV of FIG. 3.

FIG. 5 is a perspective view of the retractable stock guide, shown attached loosely to an associated die member, and with the retractable guide cap portion in a retracted load/unload condition, wherein portions thereof have been broken away to reveal internal construction.

FIG. 6 is a fragmentary, top plan view of the retractable stock guide shown in FIG. 5, with a section of stock strip ready to be loaded into or removed from the retractable stock guide.

FIG. 7 is a vertical cross-sectional view of the retractable stock guide and stock strip shown in FIG. 6, taken along the line VII-VII of FIG. 6.

FIG. 13 is a perspective view of a stationary guide rail portion of the retractable stock guide.

FIG. 14 is a plan view of the stationary guide rail.

FIG. 15 is an end elevational view of the stationary guide rail.

FIG. 16 is a side elevational view of the stationary guide rail.

FIG. 17 is a perspective view of the retractable guide cap.

FIG. 18 is a plan view of the retractable guide cap.

FIG. 19 is an end elevational view of the retractable guide cap.

FIG. 20 is a side elevational view of the retractable guide cap.

FIG. 28 is a top plan view of the guide rail and retractable guide cap portions of the retractable stock guide arranged in an overlying aligned fashion over two mounting apertures on an associated die member in the retracted load/unload condition.

FIG. 29 is a cross-sectional view of the die member, guide rail and retractable guide cap shown in FIG. 28, taken along the line XXVIIII-XXVIIII of FIG. 28.

FIG. 30 is a cross-sectional view of the die member, guide rail and retractable guide cap of FIG. 28, taken along the line XXX-XXX of FIG. 28.

FIG. 31 is a top plan view of the die member, guide rail and retractable guide cap shown in FIGS. 28-30, with a pair of mounting studs loosely interconnecting the same together in the retracted load/unload condition.

FIG. 32 is a cross-sectional view of the stock guide assembly shown in FIG. 31, taken along the line XXXII-XXXII of FIG. 31.

FIG. 33 is a cross-sectional view of the stock guide assembly shown in FIG. 31, taken along the line XXXIII-XXXIII of FIG. 31.

FIG. 34 is a top plan view of the stock guide assembly of FIGS. 31-33, shown assembled to the die member in the extended run condition.

FIG. 35 is a cross-sectional view of the stock guide assembly of FIG. 34, taken along the line XXXV-XXXV of FIG. 34.

FIG. 36 is a cross-sectional view of the stock guide assembly of FIG. 34, taken along the line XXXVI-XXXVI of FIG. 34.

FIG. 37 is a fragmentary, bottom perspective view of the guide rail, retractable guide cap and mounting stud prior to assembly in an associated die member.

FIG. 38 is a top perspective view of the retractable stock guide assembly prior to installation in an associated die member.

FIG. 62 is a perspective view of another embodiment of a retractable stock guide embodying the present invention, which includes guide rollers of the type shown in FIGS. 39-57, and also incorporates coil springs that resiliently urges the retractable guide cap to the retracted load/unload position.

FIG. 63 is an exploded perspective view of the retractable stock guide shown in FIG. 62.

FIG. 64 is a fragmentary, plan view of the retractable stock guide shown in FIGS. 62-63, with the retractable guide cap in the retracted load/unload condition.

FIG. 65 is a fragmentary, plan view of the retractable stock guide shown in FIGS. 62-64, with the retractable guide cap in the extended run condition.

FIG. 66 is a perspective view of yet another embodiment of a retractable stock guide embodying the present invention, which includes guide rollers of the type shown in FIGS. 39-57, and also incorporates leaf springs that resiliently urge the retractable guide cap to the retracted load/unload position.

FIG. 67 is an exploded perspective view of the retractable stock guide shown in FIG. 66.

FIG. 68 is a fragmentary top plan view of the retractable stock guide shown in FIGS. 66 and 67, with the retractable guide cap in the retracted load/unload position.

FIG. 69 is an enlarged, fragmentary cross-sectional view of the retractable stock guide shown in FIGS. 66-68, taken along the line XXXXXXVIIII-XXXXXXVIIII of FIG. 68.

FIG. 70 is a fragmentary, plan view of the retractable stock guide shown in FIGS. 66-69, with the retractable guide cap in the extended run condition.

FIG. 71 is an enlarged, fragmentary cross-sectional view of the retractable stock guide shown in FIGS. 66-70, taken along the line XXXXXXXI-XXXXXXXI of FIG. 70.

DETAILED DESCRIPTION OF THE PREFERRED EMBODIMENTS

Figure 8:
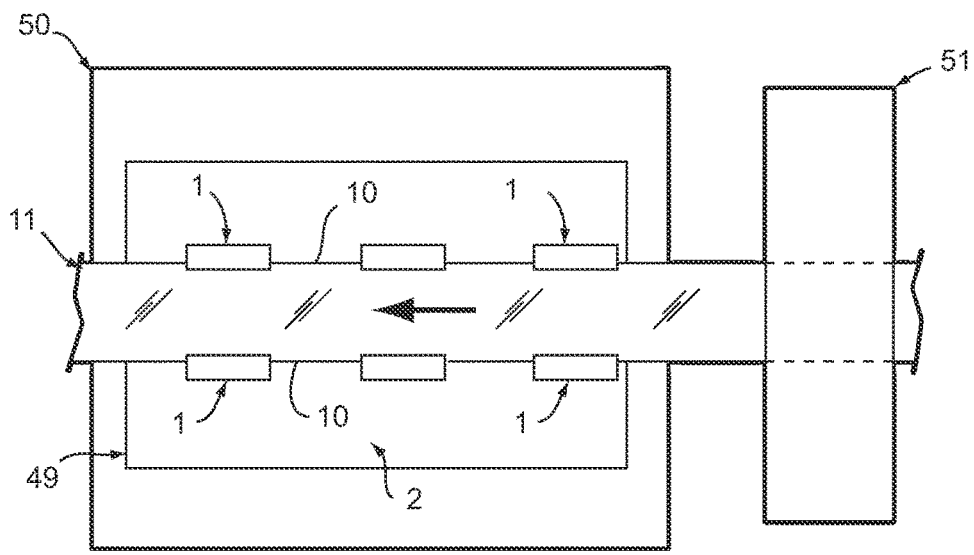
FIG. 8 is a partially schematic, plan view of a die/tool equipped with a plurality of retractable stock guide assemblies positioned along opposite side edges of a stock strip for precisely guiding the same longitudinally along a straight line through the die.
Figure 9:
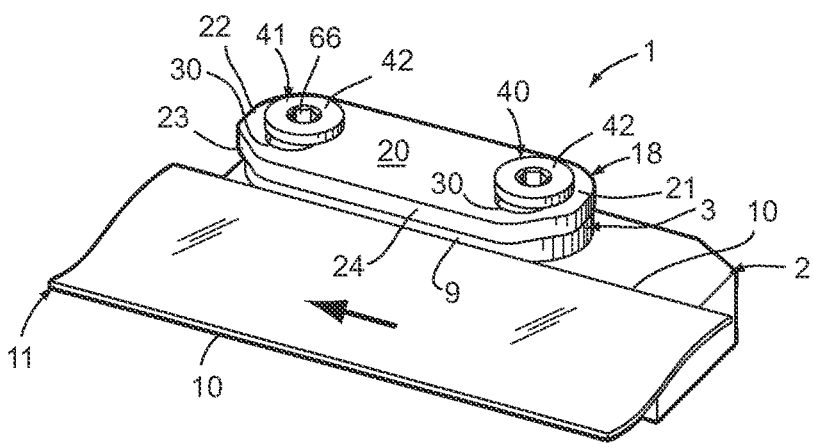
FIG. 9 is a perspective view of the retractable stock guide attached to an associated die member, with the retractable guide cap shown in the extended run condition, and a section of stock strip being guided longitudinally through an associated die.

For purposes of description herein, the terms "upper," "lower," "right," "left," "rear," "front," "vertical," "horizontal" and derivatives thereof shall relate to the invention as oriented in FIGS. 1-7. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-7) generally designates a retractable stock guide embodying the present invention, which is typically used in pairs as an assembly for metal forming dies and the like of the type having at least two mutually converging and diverging die members between which an elongate stock strip is shifted longitudinally to form parts from the stock strip. Retractable stock guide 1 is configured for detachable mounting on an associated die member, such as the die member 2 illustrated in FIGS. 1-7. The retractable stock guide 1 illustrated in FIGS. 1-38 includes a rigid, strap-shaped, stationary guide rail 3, which has an inner face 4 shaped for operable support on die member 2, an outer face 5 disposed generally parallel with and opposite inner face 4, a leading end portion 6, and a trailing end portion 7 disposed generally opposite leading end portion 6 of guide rail 3 and downstream thereof in the direction of stock strip travel. Stationary guide rail 3 also has a side edge 8 disposed between inner face 4 and outer face 5, which includes a laterally inward guide portion 9 oriented generally perpendicular with inner face 4 and outer face 5, and is configured to slidingly contact an adjacent side edge 10 of a section of stock strip 11 to precisely guide the same through the metal forming die associated with die member 2. Stationary guide rail 3 also includes first and second through apertures 12 and 13 extending through the inner and outer faces 4, 5 of guide rail 3 adjacent the leading and trailing end portions 6 and 7 thereof, each having a generally circular plan shape with a predetermined diameter. Retractable stock guide 1 also includes a rigid, strap-shaped retractable guide cap 18 having an inner face 19 generally overlying and operably supported by the outer face 5 of guide rail 3, an outer face 20 disposed generally parallel with and opposite the inner face 19 of guide cap 18, a leading end portion 21, and a trailing end portion 22 disposed generally opposite the leading end portion 21 of guide cap 18 and downstream thereof in the direction of stock strip travel. Retractable guide cap 18 has a side edge 23 disposed between the inner and outer faces 19, 20 of guide cap 18, which includes a laterally inward cap portion 24 that protrudes laterally inwardly over the inward guide portion 9 of the side edge 8 of stationary guide rail 3 in an extended run condition, as shown in FIGS. 2, 3 and 4, to slidingly capture at least a portion of the stock strip 11 between the retractable stock guide 1 and the die member 2. The laterally inward cap portion 24 of retractable guide cap 18 is generally aligned with the inward guide portion 9 of the side edge 8 of stationary guide rail 3 in a retracted load/unload condition, as shown in FIGS. 5, 6 and 7, to permit at least a portion of the stock strip 11 to be readily loaded into and/or removed from the retractable stock guide 1. Retractable guide cap 11 also includes first and second through apertures 25 and 26 extending through the inner and outer faces 19, 20 of guide cap 18 adjacent the leading and trailing end portion 21, 22 thereof, each having a laterally oriented, generally ovate plan shape with first and second spaced apart axes of symmetry 27, 28. Each through aperture 25, 26 is defined by a generally ovate sidewall 29 having a first arcuate portion 30 which is disposed toward the laterally inward cap portion 24 of side edge 23, is centered generally about the first axes of symmetry 27 and has a diameter generally commensurate with the predetermined diameter of the associated one of the first and second through apertures 12, 13 in the stationary guide rail 3. Each ovate sidewall 29 also has a second arcuate portion 31 which is disposed away from the laterally inward cap portion 24 of side edge 23, is centered generally about the second axis of symmetry 28, generally opposite the first arcuate portion 30 of ovate side wall 29, and has a diameter that is greater than the first arcuate portion 30 of ovate side wall 29. Retractable stock guide 1 also includes first and second mounting studs 40 and 41, each having an enlarged head portion 42 at one end thereof with a tapered outer sidewall 43 having an outside diameter with at least a portion thereof that is generally commensurate with the second arcuate portion 31 of the ovate side wall 29 defining the associated one of the first and second through holes 25 and 26 in retractable guide cap 18, and is greater than the diameter of the first arcuate portion 30 of the ovate sidewall 29 of the associated one of the first and second through apertures 25, 26 in retractable guide cap 18. The first and second mounting studs 40, 41 also include a threaded shank portion 44 at the other end thereof, generally opposite the enlarged head portion 42, that is shaped for insertion through an associated one of the first and second through apertures 25, 26 in retractable guide cap 18, an associated one of the first and second through apertures 12, 13 in stationary guide rail 3, and is threadedly anchored in the die member 2. Each mounting stud 40, 41 also includes a non-threaded collar portion 45 disposed axially between the enlarged head portion 42 and the threaded shank portion 44, and has a cylindrical shape with an outside diameter substantially commensurate with the associated one of the first and second through holes 12, 13 in stationary guide rail 3, and the first arcuate portion 30 of ovate sidewall 29 of the associated one of the first and second through holes 25, 26 in the guide cap 18. Tightening of the first and second mounting studs 40, 41 in the die member 2 engages the tapered head portions 43 of the first and second mounting studs 40, 41 against the ovate sidewalls 29 of the first and second through apertures 25, 26 in the retractable guide cap 18, and shifts the retractable guide cap 18 laterally inwardly to the extended run condition, as shown in FIGS. 2, 3 and 4 to positively capture the stock strip 11 between a pair of the stock guides 1 and the mounting face of the die member 2, and precisely guide the stock strip 11 longitudinally along a straight line through the metal forming die associated with die member 2. Loosening of the first and second mounting studs 40, 41 in the die member 2 facilitates laterally outward shifting of the retractable guide cap 18 to the retracted load/unload condition, as shown in FIGS. 5, 6 and 7 to permit the stock strip 11 to be readily loaded into and/or removed from a pair of the retractable stock guides 1.

FIG. 8 is a partially schematic, plan view of portions of a metal forming die 49, which includes die member or die tool 2, mounted in a stamping press 50. In the example illustrated in FIG. 8, the stock strip material 11 to be stamped is fed into the metal forming die 49 by an automated feed device 51, which is designed to keep the stock material flowing straight through the metal forming die 49. Three pairs of stock guides, such as the retractable stock guides 1 shown in FIGS. 1-38, are mounted on the die member 2 adjacent the side edges 10 of the stock strip 11 to keep the stock strip moving in a straight line through the die member 2 in the direction of the arrow in FIG. 8. In the example shown in FIG. 8, three pairs of stock guides 1 are mounted on the die member 2 in a laterally spaced apart, mutually parallel and oppositely facing relationship for guiding the stock strip 11 slidingly therebetween in a longitudinal direction. Each metal forming die 49 may include multiple pairs of stock guides 1 which are spaced apart longitudinally along the length of the die member 2 to insure precise guiding of the stock strip through each station of the die member.

The term "die member," as used herein, refers to any portion of a metal forming die or die set, including, but not limited to, an upper die member or die shoe, a lower die member, and all other die components, whether stationary or reciprocating, including a reciprocating pressure pad, or the like. In the illustrated examples, retractable stock guide 1 is shown mounted on a stationary die shoe which is typically located below a reciprocating upper die pad. As will be appreciated by those skilled in the art, retractable stock guide 1 can be mounted in other types of die members, and/or components in a variety of different positions and orientations, as necessary to precisely guide the stock strip 11 through the various workstations of an associated metal forming die.

Figure 10:
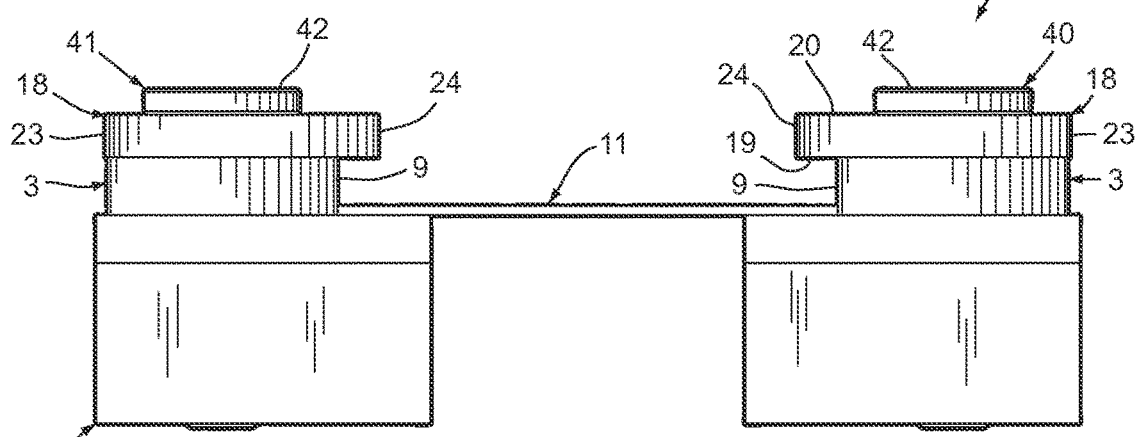
FIG. 10 is a partially schematic, end elevational view of a pair of laterally spaced apart, retractable stock guides attached to an associated die member, each shown with the retractable guide caps in the extended run condition and a stock strip positioned therebetween.
Figure 11:
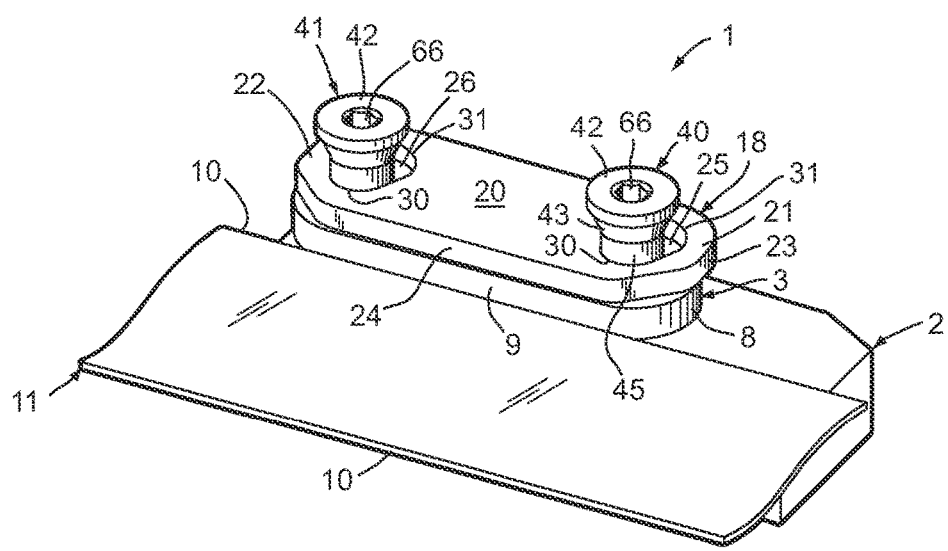
FIG. 11 is a perspective view of the retractable stock guide attached to an associated die member, with the retractable guide cap shown in the retracted load/unload condition, and with a section of stock strip therein.
Figure 12:
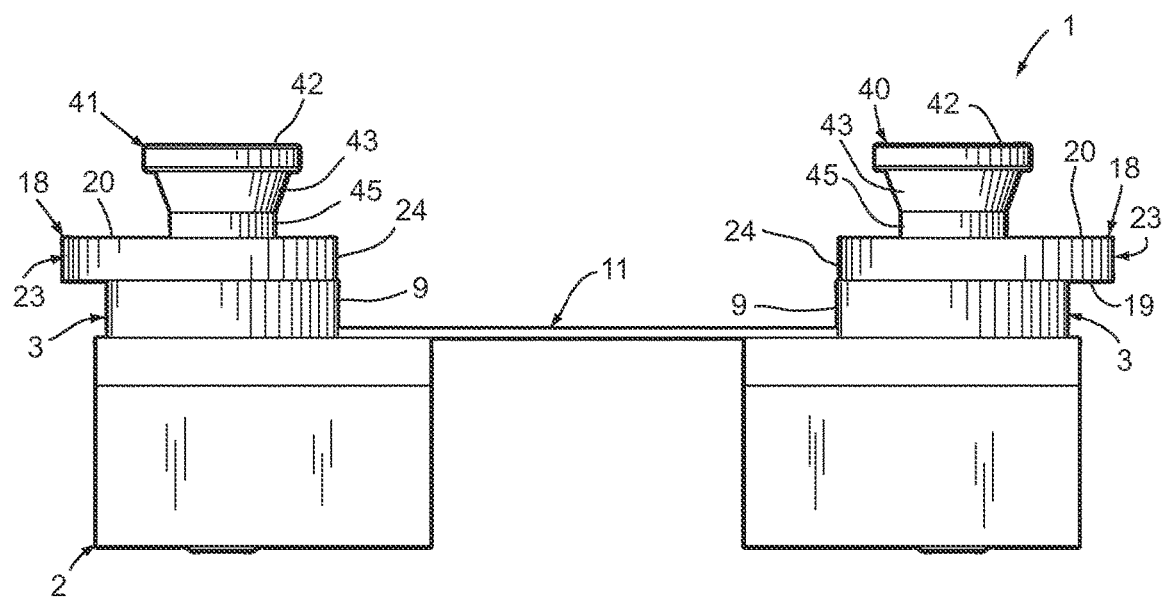
FIG. 12 is a partially schematic, end elevational view of a pair of laterally spaced apart, retractable stock guide assemblies attached to an associated die member, each shown with the retractable guide caps in the retracted load/unload condition, and a stock strip positioned therebetween.
Figure 21:
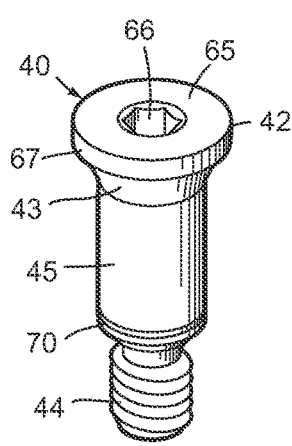
FIG. 21 is a perspective view of a mounting stud portion of the retractable stock guide.
Figure 22:
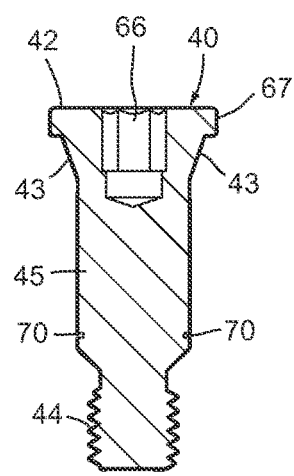
FIG. 22 is a vertical cross-sectional view of the mounting stud.
Figure 23:
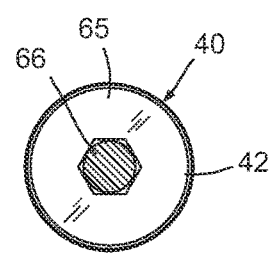
FIG. 23 is a top plan view of the mounting stud.
Figure 24:
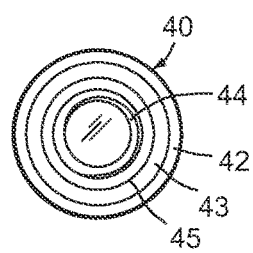
FIG. 24 is a bottom plan view of the mounting stud.

As best illustrated in FIGS. 13-16, the illustrated stationary guide rail 3 has a one-piece, solid body construction, with the opposite faces 4, 5 being generally flat and mutually parallel, and a generally rectangular plan shape with rounded ends. More specifically, the side edge 8 of the illustrated guide rail 3 includes straight side edges 54, and rounded or semi-circular ends 55 at both the leading and trailing end portions 6, 7 thereof. The illustrated stationary guide rail 3 has a fully symmetrical shape, and can be rotated both end-to-end and/or side-to-side, and still have the same configuration, which provides reduced manufacturing costs, and ease of assembly in an associated die member. The rounded end 55 positioned at the leading end portion 6 of guide rail 3, which is upstream of the guide portion 9 in the direction of stock strip travel, serves to accurately guide the stock strip into the central area between a pair of oppositely oriented, retractable stock guides 1, as shown in FIGS. 8 and 10. The illustrated guide rail 3 is constructed from a solid bar of metal, such as steel, or the like, and may be hardened to resist wear, particularly along the guide portion 9 of side edge 8. Stationary guide rail 3, including through apertures 12 and 13, as well as rounded ends 55, can be easily and quickly formed from a solid metal plate, bar, or the like by laser or water jet cutting to reduce manufacturing costs and minimize further processing of the part.

The illustrated retractable guide cap 18 (FIGS. 17-20) also has a one-piece, solid body construction, with the opposite faces 19, 20 being generally flat and mutually parallel, and a slightly modified rectangular plan shape with straight, parallel side edges 56, and half rounded/half angled ends 57. Like stationary guide rail 3, retractable guide cap 18 can be cut or otherwise formed from a solid plate or bar of rigid material, such as steel or the like. The arcuate end portions 58 of the guide cap side edge 23 are half rounded or quarter-circular, and the angled end portions 59 are generally straight or linear, and extend along an angle from the arcuate edge portion 58 to a location adjacent the inward cap portion 24, which serves to slidingly capture the stock strip 11. As best illustrated in FIGS. 17-20, the first and second through apertures 25, 26 in retractable guide cap 18 have a substantially identical size and shape, and are positioned symmetrically through guide cap 18 between the leading and trailing end portions 21, 22 and the sides 59 of side edge 23. The sidewalls 29 of through aperture 25, 26 are oriented generally perpendicular to the inner and outer faces 19, 20 of the illustrated guide cap 18, so as to provide point contact with the tapered sidewalls of mounting studs 40, 41, which assure smooth, positive shifting of guide cap 18 to the extended run condition when mounting studs 40, 41 are tightened. Through apertures 25, 26 have a unique plan shape which is generally ovate or egg-shaped with the smaller diameter sidewall end 30 centered about the first axis of symmetry 27 facing toward the inward cap portion 24, and the larger diameter sidewall end 31 centered about the second axis of symmetry 28 oriented away from the inward cap portion 24. The ovate sidewall 29 of both through apertures 25, 26 has two relatively short, straight or linear sections 60 which interconnect the first and second arcuate portions 30, 31. Like stationary guide rail 3, the retractable guide cap 18 has a fully symmetrical shape, and can be rotated both end-to-end and/or side-to-side, and still have the same configuration, which provides reduced manufacturing costs, and ease of assembly in an associated die member. As best illustrated in FIGS. 28-36, the retractable guide cap 18 preferably has a width, as measured between straight side edge portions 56, that is greater than the width of the stationary guide rail 3. Consequently, when retractable guide cap 18 is in the extended run condition, such as shown in FIGS. 34-36, the outward straight side edges 54, 56 of the guide rail 3 and guide cap 18 are generally aligned vertically, and the inward cap portion 24 of the side edge 23 of retractable guide cap 18 protrudes inwardly well over the guide portion 9 of the side edge 8 of the stationary guide rail 3 to positively capture the stock strip 11 between an oppositely facing pair of the stock guides 1 and the mounting face of the die member 2, as best shown in FIGS. 3, 4 and 10. With reference to FIGS. 28 and 31, when retractable stock guide 1 is in the retracted load/unload condition, the angled edge portions 59 on the inward area of the side edge 23 of retractable guide cap 18 expose the inward portions of the rounded ends 55 of stationary guide rail 3, thereby providing the die operator with visual assistance in correctly positioning the stock strip 11 squarely between a pair of stock guides 1.

With reference to FIGS. 21-24, the illustrated first and second mounting studs 40, 41 are rigid, being constructed from steel, or the like, have a substantially similar size and shape, and are interchangeably in retractable stock guide 1. Each illustrated mounting stud 40, 41 has a relatively flat outer end or face 65 with a recessed tool socket 66 positioned in a central portion thereof to facilitate tightening and untightening the mounting studs 40, 41. An annular rim portion 67 is disposed directly below outer end face 65, and extends axially to the top of the tapered sidewall portion 43 of the mounting studs 40, 41. The outside diameter of the rim portion 67 is greater than the diameter of both the first and second arcuate portions 30, 31 of retractable guide cap 18. The top portion of the tapered sidewall 43 of mounting studs 40, 41, which is disposed closest to rim 67, has an outside diameter that is generally commensurate with the diameter of the larger or second arcuate portion 31 of the ovate sidewalls 29 that define through apertures 25, 26 and seats thereagainst, as shown in FIGS. 2 and 4, when mounting studs 40, 41 are fully tightened in die member 2. The narrower or bottommost portion of the tapered sidewall 43, which is disposed closest to the threaded shank portion 44 of mounting studs 40, 41, has an outside diameter that is generally commensurate with the diameter of the first arcuate portion 30 of the ovate sidewalls 29 that define through apertures 25 and 26 in retractable guide cap 18, as well as the diameter of the through apertures 12, 13 in stationary guide rail 3. The non-threaded collar portion 45 of each mounting stud 40, 41 has a precise cylindrical shape, with a smooth exterior surface which serves to accurately and securely locate and retain the retractable stock guide assembly 1 on the die member 2, without the need for separate locating dowels, keys, or the like. The lowermost portion of the non-threaded collar portion 45 of mounting studs 40, 41 includes a circumferential extending retainer groove 70 which is generally U-shaped to selectively receive therein a C-shaped retainer ring 71. In the relaxed condition, retainer ring 71 has an outside diameter that is greater than the diameter of the first and second through apertures 12 and 13 in stationary guide rail 3, so as to keep the guide rail 3, guide cap 18 and mounting studs 40, 41 assembled loosely together as a unit when not mounted on an associated die member, as best shown in FIGS. 37 and 38. The illustrated retainer ring 71 comprises a split C-ring, having a relaxed condition with an associated first outside diameter, and a tensed condition with an associated second outside diameter that is smaller than the first outside diameter associated with the relaxed condition, whereby when the mounting studs 40, 41 are fully tightened in the die member 2, the C-rings 71 are constricted fully into the retainer groove 70 to permit complete and secure tightening of the mounting stud 40, 41 in the die member 2, as shown in FIG. 4, and when the mounting studs 40, 42 are loosened in the die member 2, C-retainer rings 71 automatically bias outwardly to the relaxed condition to keep the guide rail 3, guide cap 18 and two mounting studs 40, 41 assembled loosely together as a unit, as shown in FIGS. 37 and 38. Furthermore, in the illustrated example, the threaded shank portion 44 of each mounting stud 40, 41, has a predetermined length, which permits loosening of the mounting studs 40, 41 in the die member 2 by a predetermined amount that is sufficient to permit retractable guide cap 18 to shift between the extended run condition and the retracted load/unload condition, yet remain threadedly retained in the die member 2, as shown in FIG. 5. Preferably, mounting studs 40, 41 have a solid, one-piece construction, and can be machined from a solid rod of steel, or the like, in a single set up process for improved accuracy and reduced cost.

Figure 25:
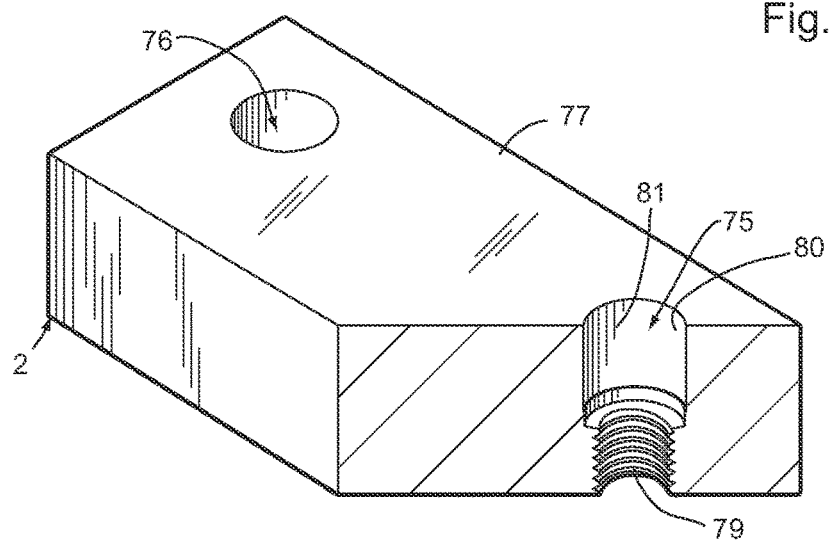
FIG. 25 is a perspective view of a fragmentary portion of a die member in which mounting apertures have been formed to mount a retractable stock guide thereon, with portions thereof broken away to reveal internal construction.
Figure 27:
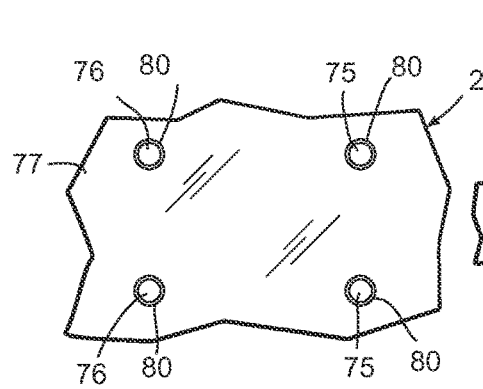
FIG. 27 is a fragmentary, plan view of the die member in which four mounting apertures have been formed to mount a pair of retractable stock guide assemblies thereto.
Figure 26:
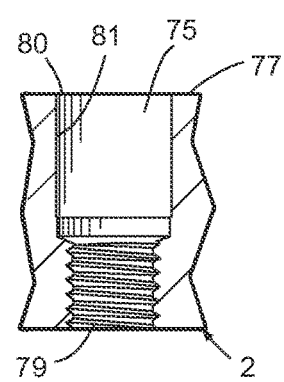
FIG. 26 is an enlarged fragmentary view of the die member and one of the mounting apertures formed therein.

As best shown in illustrated in FIGS. 25-27, each of the illustrated retractable stock guides 1 is mounted to an associated die member 2 by forming first and second mounting apertures 75 and 76 in the mounting face 77 of die member 2 in a laterally spaced-apart and aligned condition, oriented generally parallel with the direction of stock strip travel through die member 2. Mounting apertures 75, 76 are substantially identical in shape and size, and include a threaded bottom portion 79 with a diameter and shape for anchoring the threaded shank portion 44 of an associated one of the mounting studs 40, 41, as well as a non-threaded top portion 80 with a predetermined diameter that is greater than the diameter of the bottom portion 79, and is defined by an associated, precisely shaped sidewall 81 which closely receives therein the non-threaded collar portion 45 of an associated one of the mounting studs 40, 41 to accurately and securely locate and retain the retractable stock guide assembly 1 on the die member 2, without the need for separate locating dowels, keys, or the like. More specifically, the threaded bottom portion 79 of each mounting aperture 75, 76, is drilled and tapped to tightly hold the mounting studs 40, 41 and associated guide rail 3 and guide cap 18 in place on die member 2, whereas the non-threaded top portion 8 of each mounting aperture 75, 76 is drilled and reamed to accurately locate and support the mounting studs 40, 41, and associated guide rail 3 and guide cap 18 on die member 2.

In one example of the present invention, a pair of retractable stock guides 1 can be mounted on an associated die member 2 in the following fashion. With reference to FIGS. 27-38, two pairs of mounting apertures 75, 76 are formed in the mounting face 77 of die member 2 in the manner described above, locating the same along the opposite side edges 10 of the stock strip 12, as shown in FIG. 27. A stationary guide rail 3 is positioned over each pair of mounting apertures 75, 76, with the through apertures 12, 13 in the guide rails centered over the threaded bottom portions 79 of the mounting apertures 75, 76. Next, a retractable guide cap 18 is positioned abuttingly on top of each stationary guide rail 3, with the through apertures 30, 31 generally centered over the through apertures 12, 13 in the associated guide rail 3. The stacked assembly of retractable guide cap 18 directly on stationary guide rail 3 provides a very compact and low profile that is highly beneficial in most metal forming die constructions. As illustrated in FIGS. 28-33, both retractable guide caps 18 have the smaller or first arcuate portions 30 of ovate sidewall 29 centered over the mounting apertures 75, 76 in the mounting face 77 of die member 2, which corresponds to the retracted load/unload condition. A pair of mounting studs 41, 42 have the threaded shank portions 44 thereof inserted through the apertures 25, 26 of retractable guide cap 18 and the apertures 12, 13 of stationary guide rail 3, and into the mounting apertures 75, 76 in the mounting face 77 of die member 2. Mounting studs 40, 41 are then loosely tightened, so as to permit the lateral shifting of retractable guide caps 18 between the retracted load/unload condition and the extended run condition.

As will be appreciated by those skilled in the art, the use of C-rings 71 with a selected stationary guide rail 3, a retractable guide cap 18, and two mounting studs 40, 41 greatly expedites the mounting and removal of a retractable stock guide 1 on die member 2. More specifically, with a stationary guide rail 3 and retractable guide cap 18 in the stacked and aligned relationship discussed above, a pair of mounting studs are inserted through the two sets of through holes 25 and 12 and 26 and 13 in guide cap 18 and guide rail 3, respectively, until the threaded shank portions 44 of mounting studs 40, 41 protrude outwardly from the assembly. A pair of C-shaped retainer rings 71 are then shaped into the retainer grooves 70 in mounting studs 40, 41, which keeps the stationary guide rail 3, the retractable guide cap 18, and the two mounting studs 40, 41 held loosely together as a unit prior to installation on an associated die member 2. The loosely assembled retractable stock guide 1 can then be placed as a unit over a pair of mounting holes 75, 76 formed in the mounting surface 77 of die member 2 in the fashion discussed above. The threaded shank portions 44 of the two mounting studs 40, 41 are then loosely tightened in the mounting holes 75, 76 of die member 3, thereby automatically locating all components of the retractable stock guide 1 on die member 2, in a ready condition to load a stock strip 11 therein.

With both retractable guide caps 18 in the retracted load/unload condition, a stock strip 11 is positioned between the two retractable stock guides 1, with the side edges 10 of the stock strip 11 being closely positioned adjacent to the guide portions 9 of the stationary guide rails 3 for sliding contact therebetween. Next, both pairs of mounting studs 40, 41 are tightened in the die member 2, thereby engaging the tapered head portions 43 of the mounting studs 40, 41 against the ovate sidewalls 29 of the two through apertures 25, 26 in both retractable guide caps 18, thereby shifting both retractable guide caps 18 laterally inwardly to the extended run condition, as shown in FIGS. 34-36, thereby positively capturing the stock strip 11 between the two retractable stock guides 1 and the mounting face 77 of the die member 2, and precisely guiding the stock strip 11 longitudinally along a straight line through the metal forming die 49.

The stock strip 11 can be removed from the stock guide assembly 1 by simply loosening each of the mounting studs 40, 41 an amount sufficient to permit the guide caps 18 to be manually or otherwise shifted from the extended run condition to the retracted load/unload condition. The mounting studs 40, 41 can be loosened individually, so as to retain the stock guides 1 in the intended location on die member 2. Preferably, the mounting studs 40, 41 are not completely removed from the die member, unless they are to be replaced, so as to keep the various parts of the stock guides together as an assembly on the mounting face 77 of die member 2.

Figure 39:
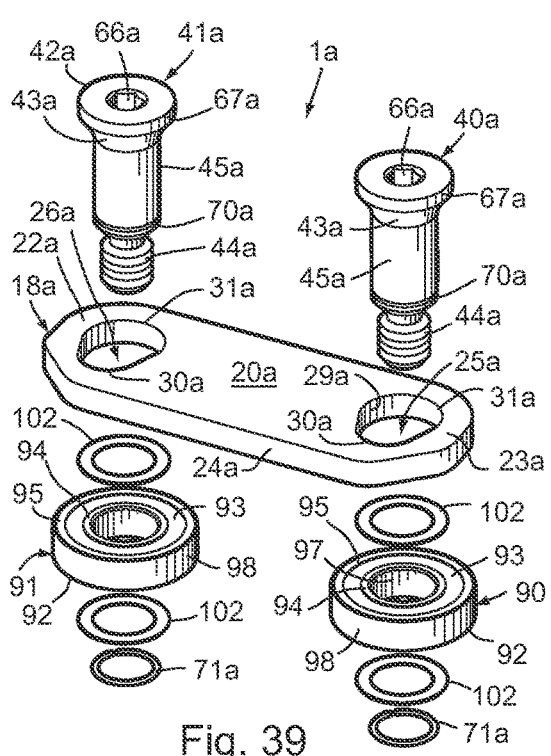
FIG. 39 is an exploded, perspective view of another embodiment of a retractable stock guide embodying the present invention, which incorporates two guide rollers.
Figure 40:
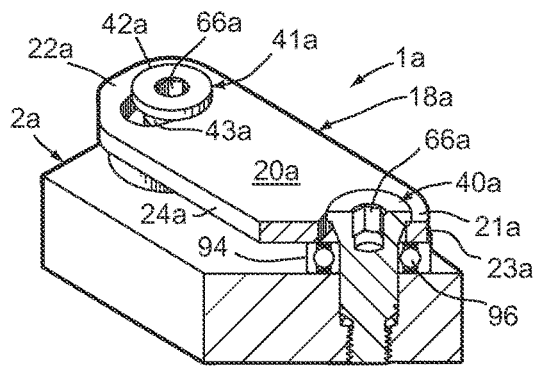
FIG. 40 is a perspective view of the retractable stock guide shown in FIG. 39, shown attached to an associated die member, and with a retractable guide cap portion thereof in an extended run condition, wherein portions thereof have been broken away to reveal internal construction.
Figure 43:
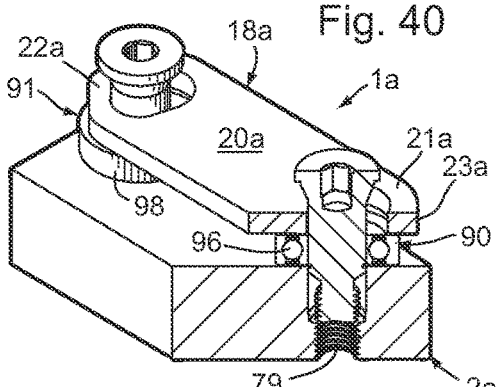
FIG. 43 is a perspective view of the retractable stock guide shown in FIGS. 39-42, shown attached loosely to an associated die member, and with the retractable guide cap in the retracted load/unload condition, wherein portions thereof have been broken away to reveal internal construction.
Figure 41:
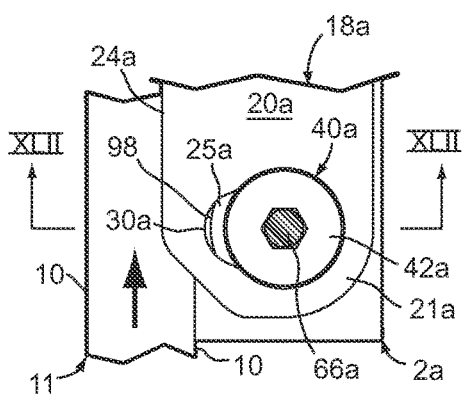
FIG. 41 is a fragmentary top plan view of the retractable stock guide shown in FIGS. 39-40, with a section of stock strip retained by the retractable stock guide in the extended run condition.
Figure 44:
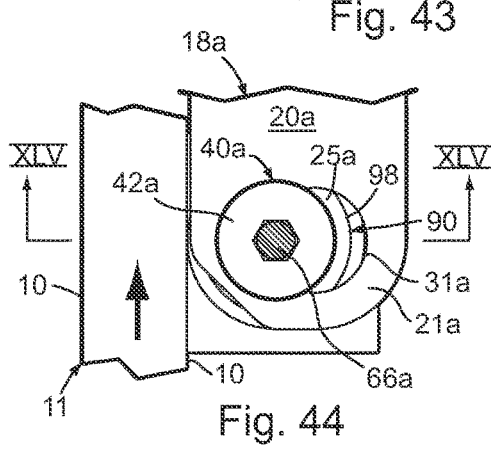
FIG. 44 is a fragmentary, top plan view of the retractable stock guide shown in FIGS. 39-43, with a section of stock strip ready to be loaded into or removed from the retractable stock guide.
Figure 42:
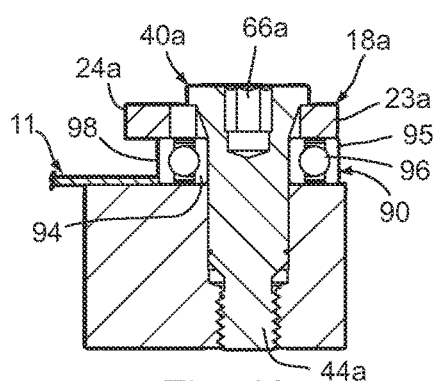
FIG. 42 is a vertical cross-sectional view of the retractable stock guide shown in FIGS. 39-41, taken along the line XXXXII-XXXXII of FIG. 41.
Figure 45:
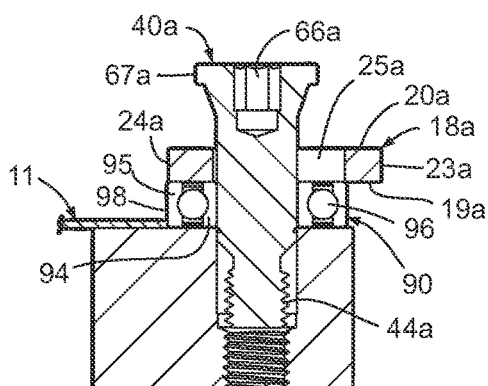
FIG. 45 is a vertical cross-sectional view of the stock guide shown in FIGS. 39-44, taken along the line XXXXV-XXXXV of FIG. 44.

The reference numeral 1a (FIGS. 39-57) generally designates another embodiment of the present invention, which uses a pair of guide rollers 90 to guide the stock strip 11 through the metal forming die 49, instead of the stationary guide rails 3 that is used in retractable stock guide 1. Since retractable stock guide 1a is similar to the previously described retractable stock guide 1, similar parts appearing in FIGS. 1-38 and 39-57 respectively, are represented by the same, corresponding reference numerals, except for the suffix "a" in the numerals of the latter. In the illustrated retractable stock guide 1a (FIGS. 39-45), guide rollers 90 and 91 have a substantially identical shape, size and construction, and include a generally circular plan configuration with an inner face 92 shaped for operable support on the die member 2, and an outer face 93 disposed generally parallel with and opposite to the inner face 92. Each guide roller 90, 91 also has a generally annularly shaped inner bearing race 94, an annularly shaped outer bearing race 95 and a plurality of rolling bearing elements 96 captured between inner and outer bearing races 94, 95, which facilitate smooth, anti-frictional rotation of outer bearing race 93 relative to inner bearing race 94, and vice versa. The inner bearing race 94 has an innermost mounting sidewall 97 with a circular plan shape and an associated predetermined diameter, and the outer bearing race 95 has an outermost stock guiding surface or sidewall 98 with a circular plan shape and an associated predetermined diameter, and is configured to rollingly contact an adjacent side edge 10 of the stock strip 11 to precisely guide the same through an associated metal forming die 49. The guide cap 18a and mounting studs 48, 41a associated with the illustrated retractable stock guide 1a are substantially identical to, and interchangeable with the guide cap 18 and mounting studs 40, 41, associated with retractable stock guide 1 (FIGS. 1-38), as described in detail above, such that further description of the same is unnecessary. The interface between mounting studs 40a and 41a, and retractable guide cap 18a of stock guide 1a is substantially identical to that discussed above relative to stock guides 1. More specifically, with retractable stock guide 1a, the threaded shank portions 44a of mounting studs 40a, 41a are inserted through the through apertures 25a, 26a in guide cap 18a, and the inner mounting sidewalls 97 of guide rollers 90, 91, and then threadedly anchored into the die member 2. The tightening of the mounting studs 40a, 41a in die member 2 engages the tapered sidewall portions 43a of the two mounting studs 40a, 41a against the ovate sidewalls 29a of the first and second through apertures 24a, 25a in guide cap 18a, and shifts the guide cap 18a laterally inwardly to the extended run condition, as shown in FIGS. 40, 41 and 42, to positively capture at least a portion of the stock strip 11 between the retractable stock guide 1a and the die member 2, and precisely guide the stock strip 11 longitudinally along a straight line through an associated metal forming die 49. Loosening of the first and second mounting studs 40a, 41a in the die member 2 facilitates laterally outward shifting of the guide cap 18a to the retracted load/unload condition, as shown in FIGS. 43, 44 and 45 to permit at least a portion of the stock strip 11a to be readily loaded into and/or removed from the retractable stock guide 1a.

With reference to FIGS. 50-57, the illustrated guide rollers 90, 91 are substantially identical and comprise ball bearings having a generally conventional construction. Preferably, the thickness of the guide rollers 90, 91, as measured between the inner and outer faces 92, 93 thereof, is somewhat similar to the thickness of the stationary guide rail 3 associated with retractable stock guide 1. Furthermore, the illustrated retractable stock guide 1a includes four substantially identical shims 102, each of which has an annular plan configuration, and a relatively thin thickness. In the illustrated example, the inside diameter of each shim 102 is commensurate with or slightly larger than each inside diameter of the inner mounting sidewall 97 of roller guides 90, 91, and the outside diameter of each shim 102 is slightly greater than the larger or second arcuate portion 31a of the ovate sidewall 29a of the through apertures 25a, 26a in guide cap 18a. More specifically, a pair of shims 102 are mounted on each mounting stud 40a, 41a over the inner and outer faces 92, 93 of the guide rollers 90, 91, as best shown in FIG. 39. Shims 102 protect against entry of debris into the interior areas of roller guides 90, 91 and otherwise facilitate smooth and accurate rotation of roller guides 90, 91 against the side edges 10 of stock strip 11, as well as smooth lateral shifting of guide cap 18a between the extended run condition and the retracted load/unload condition.

In one example of the present invention, a pair of retractable stock guides 1a can be mounted on an associated die member 2 in a fashion similar to that described above relative to retractable stock guide 1. More specifically, as shown in FIGS. 27-38, two pairs of mounting apertures 75, 76 are formed in the mounting face 77 of die member 2 in the manner described above, locating the same along the opposite side edges 10 of the stock strip 12. A pair of shims 102 are positioned over each pair of mounting apertures 75, 76. A pair of guide rollers 90, 91 are positioned over the shims 102 on the mounting face 77 of die member 2 with the inner faces 92 thereof abutting the outer faces of the shims 102. A second pair of shims 102 is then positioned on the outer faces 93 of guide rollers 90, 91. Each stack of shims 102 and guide rollers 90, 91 are vertically aligned so that their centers are concentric with the associated mounting apertures 75, 76, and the mounting face 77 of die member 2. A retractable guide cap 18a is positioned abuttingly on top of the uppermost shims 102 supported on the outer faces 93 of guide rollers 90, 91, with the through apertures 30a, 31a generally centered over the inner mounting sidewalls 97 of guide rollers 90, 91. The stacked assembly of retractable guide cap 18a directly on the shims 102 and guide rollers 90, 91 provides a very compact and low profile that is highly beneficial in most metal forming die constructions. The pair of mounting studs 41a, 42a have the threaded shank portions 44a thereof inserted through the apertures 25a, 26a of retractable guide cap 18a and the inner mounting sidewalls 97 of guide rollers 90, 91 as well as through the centers of shims 102, and then into the mounting apertures 75, 76 in the mounting face 77 of die member 2. Mounting studs 40a, 41a are then loosely tightened, so as to permit the lateral shifting of the retractable guide caps 18a between the retracted load/unload condition.

Figure 57:
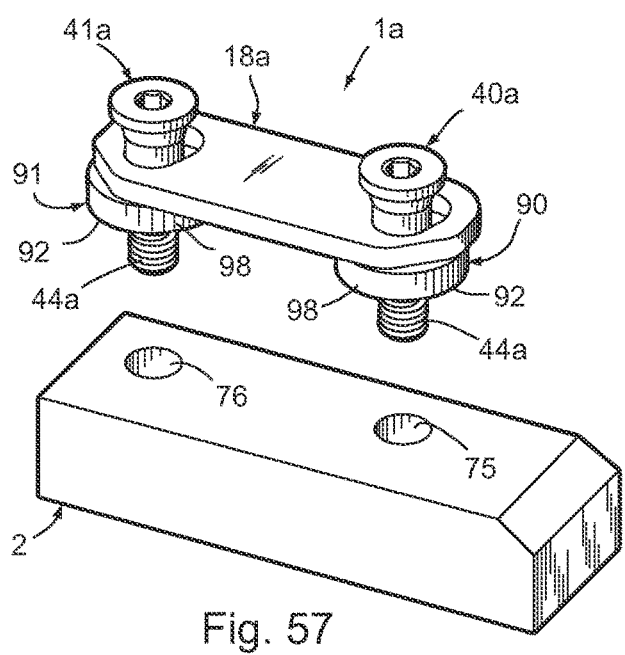
FIG. 57 is a top perspective view of the retractable stock guide shown in FIGS. 39-55, being loosely assembled prior to mounting in an associated die member.
Figure 56:
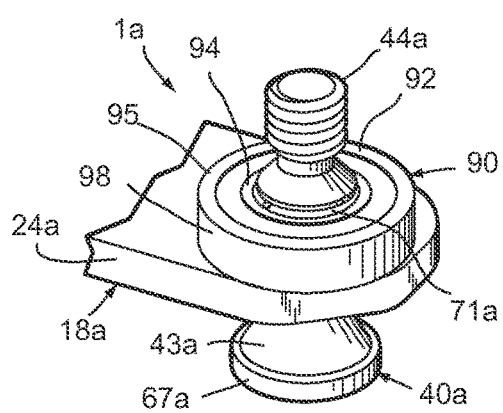
FIG. 56 is a fragmentary, bottom perspective view of the retractable stock guide shown in FIGS. 39-55, being loosely assembled prior to installation in an associated die member.
Figure 58:
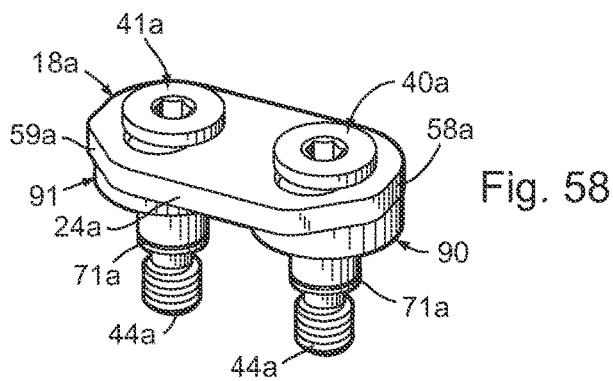
FIGS. 58-61 are perspective views of differently sized ones of the retractable stock guides shown in FIGS. 39-57, and also embodying the present invention.
Figure 59:
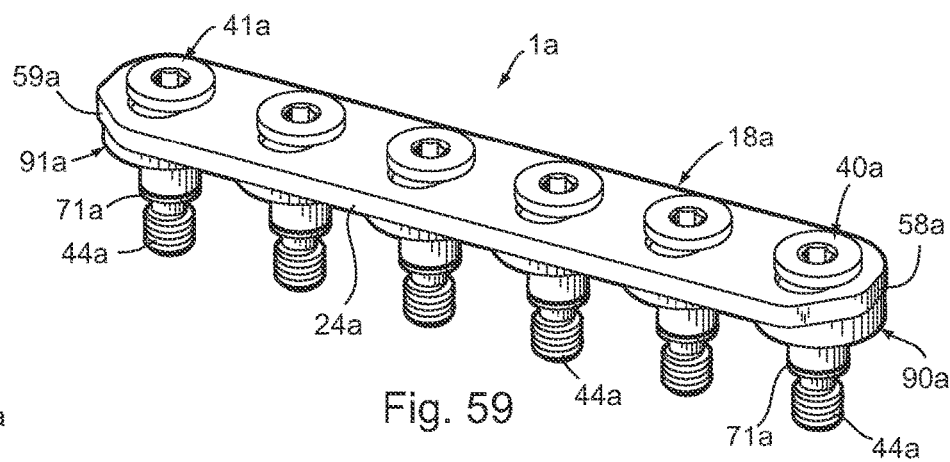
Figure 60:
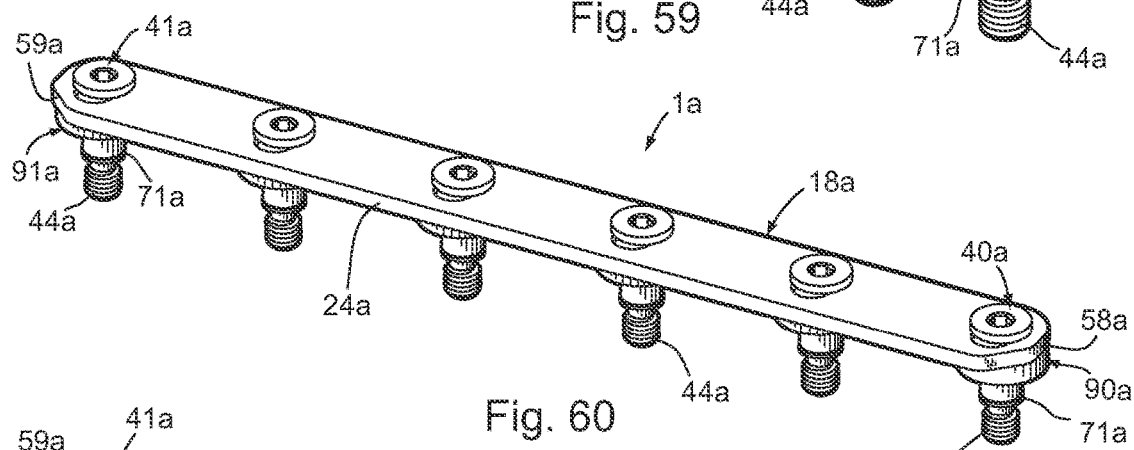
Figure 61:
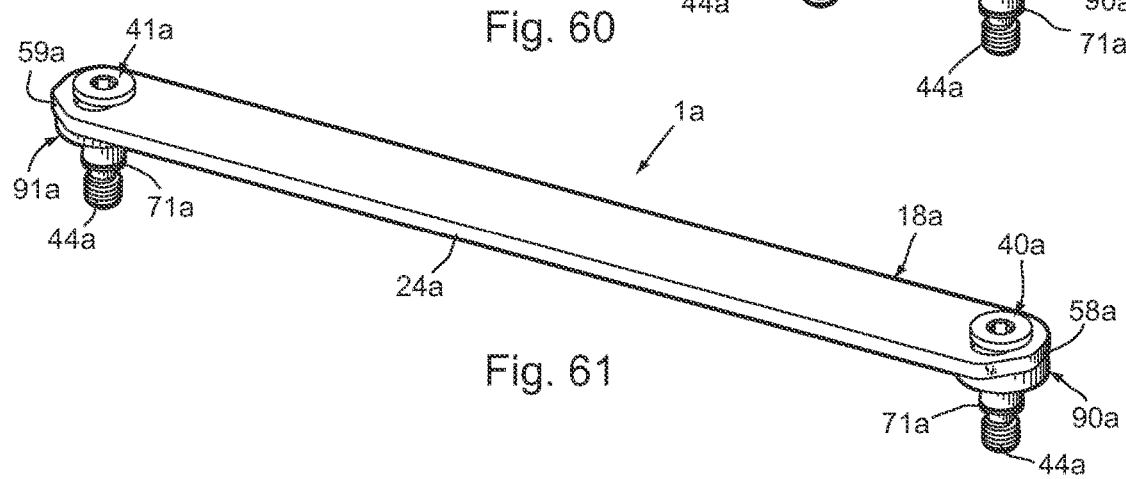

In a manner similar to retractable stock guide 1 described above, as will be appreciated by those skilled in the art, the use of C-rings 71 with two guide rollers 90, 91, four shims 102, a retractable guide cap 18a and two mounting studs 40a, 41a, greatly expedites the mounting and removal of retractable stock guide 1a on die member 2. More specifically, with the guide roller 90, 91, shims 102 and retractable guide cap 18a in the stacked and aligned relationship discussed above, a pair of mounting studs 40a, 41a are inserted through the through holes 25a, 26a in guide cap 18a, the inner mounting sidewalls 97 of guide rollers 90, 91 and the centers of shims 102, until the threaded shank portions 44a of mounting studs 40a, 41a protrude outwardly from the assembly. A pair of C-shaped retainer rings 71a are then snapped into the retainer grooves 70a in the mounting studs 40a, 41a, which keeps the two guide rollers 90, 91, the four shims 102, the retractable guide cap 18a, and the two mounting studs 40a, 41a, held loosely together as a unit prior to installation on an associated die member 2, as best shown in FIGS. 56 and 57. The loosely assembled retractable stock guide 1a can then be placed as a unit over a pair of mounting holes 75, 76, formed in the mounting surface 77 of die member 2 in the fashion discussed above. The threaded shank portions 44a of the two mounting studs 40a, 41a are then loosely tightened in the mounting holes 75, 76 of die member 3, thereby automatically locating all components of the retractable stock guide 1a on die member 2, in a ready condition to load a stock strip 11 therein.

Figure 46:
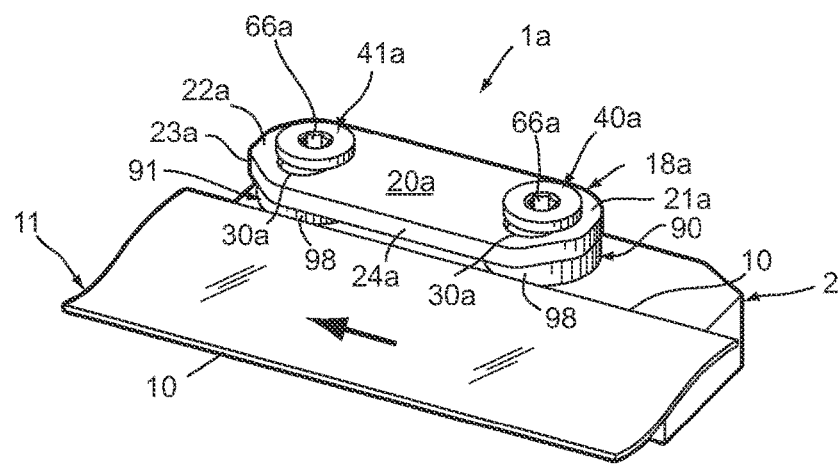
FIG. 46 is a perspective view of the retractable stock guide shown in FIGS. 39-45, attached to an associated die member with a section of stock strip retained in the extended run condition.
Figure 47:
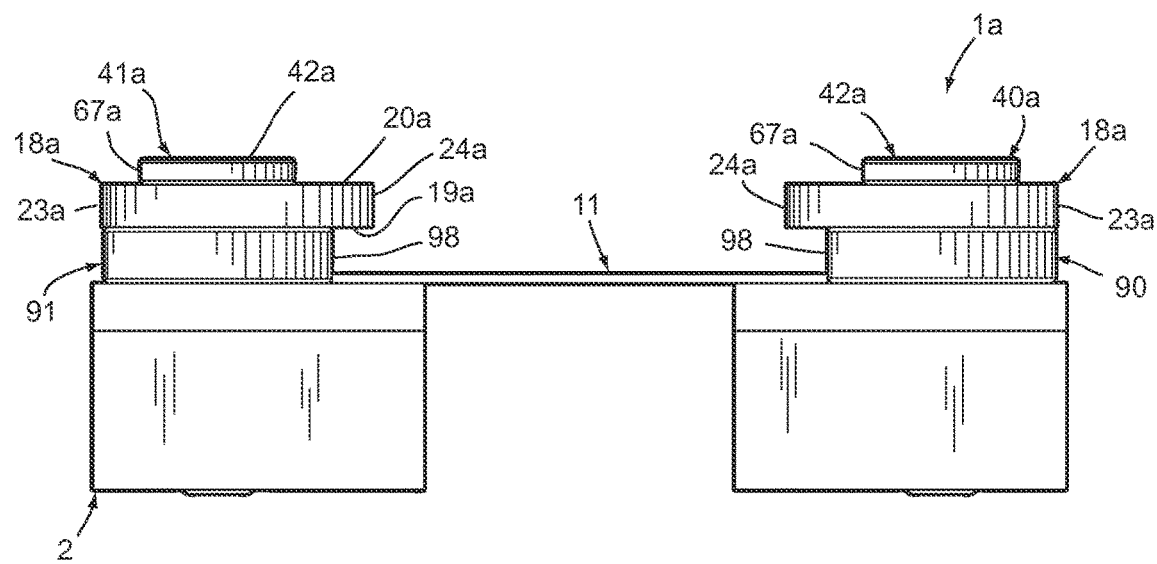
FIG. 47 is a partially schematic, elevational view of a pair of the retractable stock guides shown in FIGS. 39-40, mounted attached to an associated die member in a laterally spaced apart position, with a stock strip retained therebetween in the extended run condition.
Figure 48:
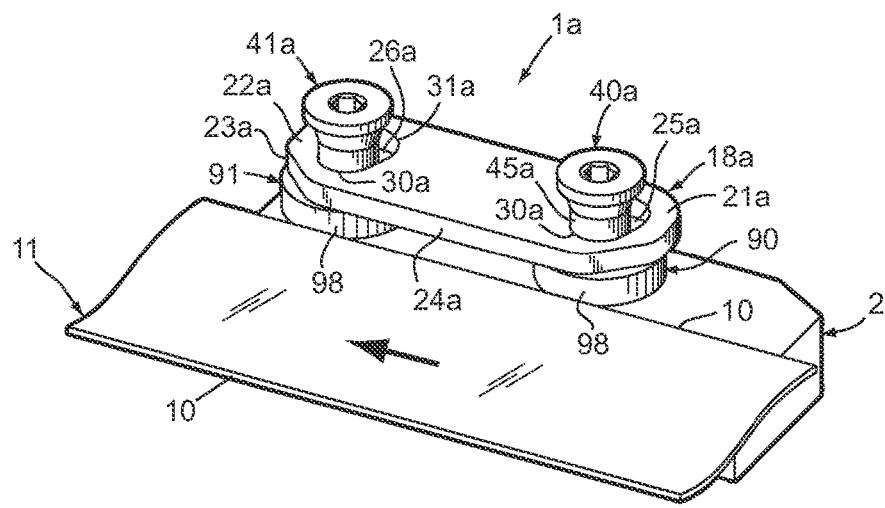
FIG. 48 is a perspective view of the retractable stock guide shown in FIGS. 39-47, attached to an associated die member with the retractable guide caps in the retracted load/unload condition to permit insertion and removal of an associated stock strip.
Figure 49:
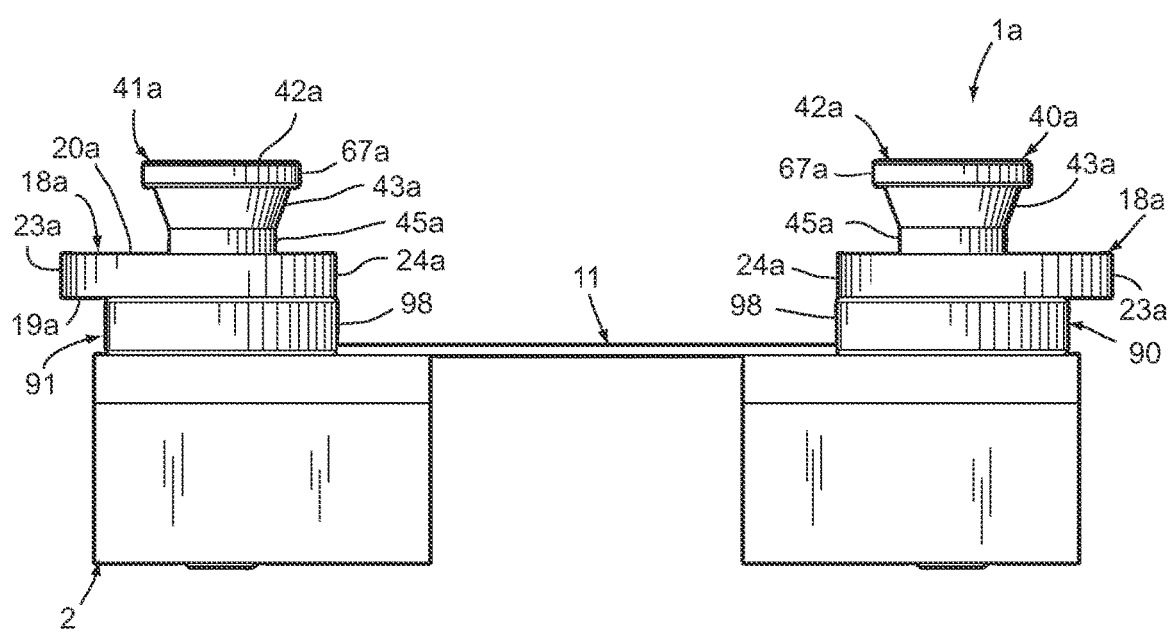
FIG. 49 is an end elevational view of a pair of the retractable stock guides shown in FIGS. 39-48, mounted to associated die members in a laterally spaced apart condition with retractable guide caps in the retracted load/unload condition to permit loading and unloading the stock strip from inbetween the two retractable stock guide assemblies.
Figure 50:
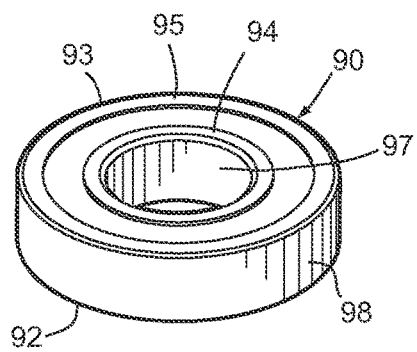
FIG. 50 is a perspective view of a guide roller portion of the retractable stock guide shown in FIGS. 39-49.
Figure 51:
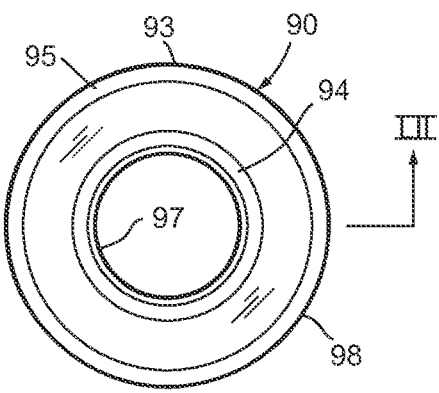
FIG. 51 is a plan view of the guide roller.
Figure 52:
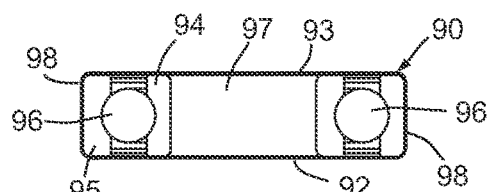
FIG. 52 is a cross-sectional view of the guide roller, taken along the line XXXXXII-XXXXXII of FIG. 1.
Figure 53:
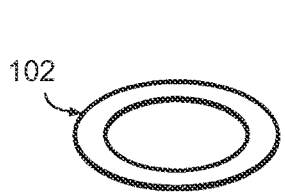
FIG. 53 is a perspective view of a shim portion of the retractable stock guide shown in FIGS. 39-52.
Figure 54:
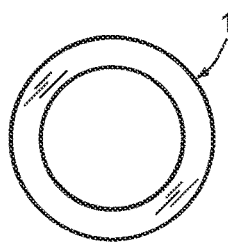
FIG. 54 is a plan view of the shim.
Figure 55:
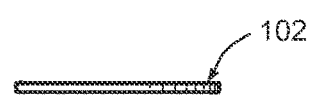
FIG. 55 is a side elevational view of the shim.

With both retractable guide caps 18a in the retracted load/unload condition, a stock strip 11 is positioned between the two retractable stock guides 1a, with the side edges 10 of the stock strip 11 being closely positioned adjacent to the stock guiding sidewalls 98 of the guide rollers 90, 91 for rolling contact therebetween. Next, both pairs of mounting studs 40a, 41a are tightened in the die member 2, thereby engaging the tapered head portions 43a of the mounting studs 40a, 41a against the ovate sidewalls 29a of the two through apertures 25a, 26a in both retractable guide caps 18a, thereby shifting both retractable guide caps 18a laterally inwardly to the extended run condition, as shown in FIGS. 46 and 47, thereby positively capturing the stock strip 11 between the two retractable stock guides 1a and the mounting face 77 of the die member 2, and precisely guiding the stock strip 11 longitudinally along a straight line through the metal forming die 49. The rolling action of guide rollers 90, 91 provides very low friction support for the stock strip 11 as well as improved guidance.

As will be appreciated by those having ordinary skill in the art of metal forming dies, both retractable stock guides 1 and 1a can be provided in a wide variety of different sizes and configurations to accommodate the needs of die makers for a particular application. For example, FIGS. 58-61 illustrate a variety of differently sized and configured retractable stock guides 1a, each of which has at least two guide rollers 90, 91, one guide cap 18a and at least two mounting studs 40a, 41a. For example, the retractable stock guide 1a shown in FIG. 58 has a rather short guide cap 18a, with one pair of guide rollers 90a, 91a supported by two mounting studs 40a, 41a adjacent opposite ends of guide cap 18a. The retractable stock guide 1a shown in FIG. 59 has a longer guide cap 18a, with three pairs of guide rollers 90a, 91a supported by three pairs of mounting studs 40a, 41a, spaced along the length of guide cap 18a. The retractable stock guide 1a illustrated in FIG. 60 has a very long guide cap 18, with three pairs of guide rollers 90a, 91a and three pairs of mounting studs 40a, 41a, which are spaced longitudinally along the length of guide cap 18a, further apart than those shown in FIG. 59. Finally, the retractable stock guide 1a shown in FIG. 61 has a very long guide cap 18, with only two guide rollers 90a, 91a and two associated mounting studs 40a, 41a, disposed adjacent the opposite ends of guide cap 18a. Similar variations of the retractable stock guide 1 shown in FIGS. 1-38 are also possible. Retractable stock guides 1 and 1a can be provided in a wide variety of different lengths and configurations, so as to accommodate use in different metal forming die applications.

The reference numeral 1b (FIGS. 62-65) generally designates yet another embodiment of the present invention, having a coil spring return for the guide cap. Since retractable stock guide 1b is similar to the previously described stock guides 1 and 1a, similar parts appearing in FIGS. 62-65 and FIGS. 1-61, respectively, are represented by the same, corresponding reference numeral, except for the suffix "b" in the numerals of the latter. In the retractable stock guide 1b shown in FIGS. 62-65, a pair of coil springs 110 are mounted in an associated guide cap 18b adjacent the through apertures 25b and 26b at the leading and trailing end portions 21b, 22b, and serve to resiliently bias the associated guide cap 18a from the extended run condition to the retracted load/unload condition, so as to facilitate quick and easy loading of the stock strip 11 between a pair of retractable stock guides 1b. More specifically, in the illustrated example, torsion springs or coil springs 110 have a substantially identical shape and size, and include a cylindrically coiled center portion 112 with straight end legs 113 and 114 extending radially outwardly from the center portion 112 of coil spring 110 in different directions. Each through aperture 25b, 26b in guide cap 18b is cut or otherwise formed inwardly with a cylindrical socket portion 115 in which the center portion 112 of coil spring 110 is received and retained, and one slot 116 which extends continuously and generally tangentially from socket portion 115, in which the end arm 114 of coil spring 110 is closely received and retained. Furthermore, in each of through apertures 25b, 26b of guide cap 18b, that portion of the ovate sidewall 29b associated with the second arcuate portion 31b is extended arcuately away from the stock guiding sidewall 98b of guide rollers 90b, 91b, and includes a radially outwardly protruding notch 120 defined by a straight edge 121 which extends to the socket 115. The opposite end leg 113 of coil spring 110 abuts against the outside surface of the non-threaded collar portion 45b of mounting studs 40b, 41b, as best shown in FIGS. 64 and 65. Like retractable stock guides 1 and 1a, when mounting studs 40b, 41b are tightened in the associated die member 2, the tapered head sidewalls 43b of the mounting studs 40b, 41b engage against the ovate sidewalls 29b of the first and second through apertures 30b, 31b in guide cap 18b, and shift the guide cap 18b laterally inwardly to the extended run condition, which contemporaneously shifts each coil spring leg 113 in a clockwise direction, as viewed in FIGS. 64 and 65, so as to tension each coil springs 110, and also positively capture the stock strip 11 between the pair of the stock guides 1b and the mounting surface 77 of the associated die member 2, so as to precisely guide the stock strip 11 longitudinally along a straight line through the metal forming die 49. When mounting studs 40b, 41b are loosened, the tapered sidewalls 43b of mounting studs 40b, 41b disengage the ovate sidewalls 29b of guide cap 18b, and the resilient forces generated in tensed coil springs 110 laterally shifts the guide cap 18b outwardly to the retracted load/unload condition to permit the stock strip 11 to be readily loaded into and/or removed from inbetween the pair of stock guides 1b. Hence, the torsion springs 110 which are mounted in the guide cap 18b, automatically shift the guide cap 18b back to the retracted load/unload condition once the mounting studs 40b, 41b are loosened.

The reference numeral 1c (FIGS. 66-71) generally designate another embodiment of the present invention, having a leaf spring return for the guide cap. Since retractable stock guide 1c is similar to the previously described retractable stock guides 1, 1a, and particularly 1b, similar parts appearing in FIGS. 1-65 and FIGS. 66-71, respectively are represented by the same, corresponding reference numerals, except for the suffix "c" in the numerals of the latter. In the retractable stock guide 1c shown in FIGS. 66-71, a pair of flat springs or leaf springs 125 are mounted in the associated guide cap 18c adjacent the through apertures 25c and 26c at the leading and trailing end portions 21c, 22c, and serve to resiliently bias the associated guide cap 18c from the extended run condition to the retracted load/unload condition, so as to facilitate quick and easy loading and/or unloading of the stock strip 11 between a pair of retractable stock guides 1c. More specifically, in the illustrated example, flat, straight relatively thin leaf springs 125 have a substantially identical rectangular plan shape and size, and include opposite end portions 126 and 127. Each through aperture 25c, 26c in guide cap 18c is cut or otherwise formed inwardly with a linear slot 128 in which the end portion 127 of leaf spring 125 is pressed, so as to retain the same securely in a stationary fashion relative to guide cap 18c. Furthermore, each through aperture 25c, 26c of guide cap 18c, at that portion of the ovate sidewall 29c associated with the second arcuate portion 31c is extended arcuately away from the stock guiding sidewall 98c of guide rollers 90c, 91c, and includes the radially outwardly protruding notch 129, which is in part defined by a curved edge 130 that extends back into the open end of slot 128. The opposite end portion 126 of each leaf spring 125 abuts against the outside surface of the non-threaded collar portion 45c of mounting studs 40c, 41c, as best shown in FIGS. 68-71. Like retractable stock guides 1, 1a and 1b, when mounting studs 40c, 41c are tightened in the associated die member 2, the tapered head sidewalls 43c of the mounting studs 40c, 41c engage against the ovate sidewalls 29c of the first and second through apertures 30c, 31c in guide cap 18c, and shift the guide cap 18c laterally inwardly to the extended run condition, which contemporaneously shifts the free end 126 of each coil spring 127 in a clockwise direction as viewed in FIGS. 68 and 70, so as to tension each leaf spring 125, and also positively capture the stock strip 11 between a pair of the stock guides 1c and the associated die member 2, so as to precisely guide the stock strip 11 longitudinally along a straight line through the metal forming die 49. When mounting studs 40c, 41c are loosened, the tapered sidewalls 43c of mounting studs 40c, 41c disengage the ovate sidewalls 29c of guide cap 18c, and the resilient forces generated in tensed leaf springs 125 laterally shift the guide cap 18c inwardly to the retracted load/unload condition to permit the stock strip 11 to be readily loaded into and removed from inbetween the pair of stock guides 1c. Hence, the leaf springs 125, which are mounted in the guide cap 18c, automatically shift the guide cap 18c back to the retracted load/unload condition, once the mounting studs 40c, 41c are loosened.

Each of the retractable stock guides 1, 1a, 1b and 1c incorporates a unique design which positively drives or shifts the associated guide cap into the extended run condition when the associated mounting studs are tightened in the die member or die tool, automatically ensuring that the guide cap is in the proper run condition. The retractable guide cap provides easy removal of a stock strip from the die member or an associated die tool. The mounting studs do not have to be removed from the die member or die tool to shift the guide cap between the extended run condition and the retracted load/unload condition. The retractable stock guides 1, 1a, 1b and 1c are economical to manufacture, since the guide caps can be laser or water jet cut from a plate or bar of rigid material, and the mounting studs have a one-piece construction that can be formed in a single set up. The guide cap and mounting stud portions of the retractable stock guides 1, 1a, 1b and 1c can be used with either a solid stationary guide rail, or a pair of roller guides, which provide low friction rolling action, as well as excellent guidance and support for the stock strip. The use of C-rings on the mounting studs keeps the various parts of the retractable stock guide assembly together when not mounted in an associated die member, so that there are no loose parts to get lost or misplaced. The construction of the mounting studs permits the retractable stock guides to be precisely located in the die tool or die member with no additional dowels or keys being required. Machining of the die member 4 and mounting of the retractable stock guides 1, 1a, 1b and 1c is simple, and requires no special tooling. Retractable stock guides 1, 1a, 1b and 1c are easy to remove and replace from the associated die tool or die member when necessary, and can be provided in multiple sizes and lengths for increased versatility.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a metal forming die having at least two mutually converging and diverging die members between which an elongate stock strip is shifted longitudinally to form parts from the stock strip, the improvement of a retractable stock guide assembly for precisely guiding the stock strip longitudinally along a straight line through said die, comprising:
first and second stock guides detachably mounted on a first one of said die members in a laterally spaced apart, mutually parallel and oppositely facing relationship for guiding the stock strip therebetween, and each including:
a rigid, strap-shaped, stationary guide rail, having:
an inner face operably supported on said one die member;
an outer face disposed generally parallel with and opposite said inner face;
a leading end portion, and a trailing end portion disposed generally opposite said leading end portion of said guide rail and downstream thereof in the direction of stock strip travel;
a side edge disposed between said inner and outer faces and having a laterally inward guide portion thereof oriented generally perpendicular with said inner and outer faces and configured to slidingly contact an adjacent side edge of the stock strip to precisely guide the same through said die;
first and second through apertures extending through said inner and outer faces of said guide rail adjacent said leading and trailing end portions thereof respectively, and each having a generally circular plan shape with a predetermined diameter;
a rigid, strap-shaped, retractable guide cap, having:
an inner face generally overlying and operably supported by said guide rail;
an outer face disposed generally parallel with and opposite said inner face of said guide cap;
a leading end portion, and a trailing end portion disposed generally opposite said leading end portion of said guide cap and downstream thereof in the direction of stock strip travel;
a side edge disposed between said inner and outer faces of said guide cap and having a laterally inward cap portion which protrudes laterally inwardly over said inward guide portion of said side edge of said guide rail in an extended run condition to slidingly capture the stock strip between said first and second stock guides and said one die member, and is generally aligned with said inward guide portion of said side edge of said guide rail in a retracted load/unload condition to permit the stock strip to be readily loaded into and removed from inbetween said first and second stock guides;

first and second through apertures extending through said inner and outer faces of said guide cap adjacent said leading and trailing end portions thereof respectively, and each having a laterally oriented, generally ovate plan shape with first and second spaced apart axes of symmetry, and being defined by a generally ovate sidewall having a first arcuate portion which is disposed toward said laterally inward cap portion of said side edge, is centered generally about said first axis of symmetry and has a diameter generally commensurate with said predetermined diameter of the associated one of said first and second through apertures in said guide rail, and a second arcuate portion which is disposed away from said laterally inward cap portion of said side edge, is centered generally about said second axis of symmetry, generally opposite said first arcuate portion of said ovate sidewall, and has a diameter greater than said first arcuate portion of said ovate sidewall;

first and second mounting studs, each having:

an enlarged head portion at one end thereof with a tapered outer sidewall having an outside diameter with at a least a portion thereof that is generally commensurate with said second arcuate portion of said ovate sidewall of the associated one of said first and second through holes in said guide cap, and is greater than the diameter of said first arcuate portion of said ovate sidewall of the associated one of said first and second through apertures in said guide cap;

a threaded shank portion at the other end thereof, generally opposite said enlarged head portion, and shaped for insertion through an associated one of said first and second through apertures in said guide cap, an associated one of said first and second through apertures in said guide rail, and being threadedly anchored in said one die member; and a non-threaded collar portion disposed axially between said enlarged head portion and said threaded shank portion and having a cylindrical shape with an outside diameter substantially commensurate with the associated one of said first and second through holes in said guide rail, and said first arcuate portion of said ovate sidewall of the associated one of said first and second through holes in said guide cap, whereby tightening of said first and second mounting studs in said first die member engages said tapered head portions of said first and second mounting studs against said ovate sidewalls of said first and second through apertures in said guide cap and shifts said guide cap laterally inwardly to said extended run condition to positively capture the stock strip between said first and second stock guides and said first die member and precisely guide the stock strip longitudinally along a straight line through said die, and loosening of said first and second mounting studs in said first die member facilitates laterally outward shifting of said guide caps to said retracted load/unload condition to permit the stock strip to be readily loaded into and removed from inbetween said first and second stock guides.

2. A metal forming die as set forth in claim 1, wherein:
said non-threaded collar portion of at least one of said first and second mounting studs includes a circumferentially extending retainer groove; and including at least one retainer ring detachably received and retained in said retainer groove in said one mounting stud and having an outside diameter greater than the predetermined diameter of the associated one of said first and second through apertures in said guide rail to keep said guide rail, said guide cap and said one mounting stud assembled together as a unit when not mounted on an associated die member.

3. A metal forming die as set forth in claim 2, wherein:
said retainer ring comprises a split C-ring having a relaxed condition with an associated first outside diameter, and a tensed condition with an associated second outside diameter that is smaller than said first outside diameter associated with said relaxed condition, whereby when said one mounting stud is tightened in said one die member, said C-ring is constricted fully into said retainer groove to permit complete and secure tightening of said one mounting stud in said one die member, and when said one mounting stud is loosened in said one die member, said C-ring automatically biases to said relaxed condition to keep said guide rail, said guide cap and said one mounting stud assembled together as a unit.

4. A metal forming die as set forth in claim 3, wherein:
said threaded shank portions of said first and second mounting studs have a predetermined length which permits loosening of said first and second mounting studs in said one die member a predetermined amount sufficient to shift said guide cap between said extended run condition and said retracted load/unload condition, yet remain threadedly retained in said one die member.

5. A metal forming die as set forth in claim 4, wherein:
said first die member includes two pairs of first and second mounting apertures in which at least portions of said first and second mounting studs of said first and second stock guides are received to securely, yet detachably mount said retractable stock guide assembly on said first die member; each of said mounting apertures includes:

a threaded bottom portion with a predetermined diameter and shape for anchoring said threaded shank portion of an associated one of said mounting studs therein; and a non-threaded top portion with a predetermined diameter that is greater than said predetermined diameter of said threaded bottom portion, and an associated precisely shaped side wall closely receiving said non-threaded collar portion of the associated one of said mounting studs therein to accurately and securely locate said retractable stock guide assembly on said one die member without separate locating dowels or keys.

6. A metal forming die as set forth in claim 5, including:
a spring member having a first portion thereof anchored in said guide cap at a location adjacent one of said first and second through apertures, and a second portion thereof engaging an associated one of said mounting studs received in said one through aperture, and resiliently urging said guide cap toward said retracted load/unload condition.

7. A metal forming die as set forth in claim 6, wherein:
said side edge of at least one of said guide rails has an arcuate portion disposed adjacent said leading end portion thereof, upstream of said guide portion of said sidewall in the direction of stock strip travel, that is shaped to accurately guide the stock strip between said first and second stock guides.

8. A metal forming die as set forth in claim 7, wherein: said inner face of said guide rail has a generally flat shape.

9. A metal forming die as set forth in claim 1, wherein: said threaded shank portions of said first and second mounting studs have a predetermined length which permits loosening of said first and second mounting studs in said one die member a predetermined amount sufficient to shift said guide cap between said extended run condition and said retracted load/unload condition, yet remain threadedly retained in said one die member.

10. A metal forming die as set forth in claim 1, wherein: said first die member includes two pairs of first and second mounting apertures in which at least portions of said first and second mounting studs of said first and second stock guides are received to securely, yet detachably mount said retractable stock guide assembly on said first die member; each of said mounting apertures includes:
    a threaded bottom portion with a predetermined diameter and shape for anchoring said threaded shank portion of an associated one of said mounting studs therein; and
    a non-threaded top portion with a predetermined diameter that is greater than said predetermined diameter of said threaded bottom portion, and an associated precisely shaped side wall closely receiving said non-threaded collar portion of the associated one of said mounting studs therein to accurately and securely locate said retractable stock guide assembly on said one die member without separate locating dowels or keys.

11. A metal forming die as set forth in claim 1, including:
    a spring member having a first portion thereof anchored in said guide cap at a location adjacent one of said first and second through apertures, and a second portion thereof engaging an associated one of said mounting studs received in said one through aperture, and resiliently urging said guide cap toward said retracted load/unload condition.

12. A metal forming die as set forth in claim 1, wherein: said side edge of at least one of said guide rails has an arcuate portion disposed adjacent said leading end portion thereof, upstream of said guide portion of said sidewall in the direction of stock strip travel, that is shaped to accurately guide the stock strip between said first and second stock guides.

13. In a metal forming die having at least two mutually converging and diverging die members between which an elongate stock strip is shifted longitudinally to form parts from the stock strip, the improvement of a retractable stock guide assembly for precisely guiding the stock strip longitudinally along a straight line through said die, comprising:
    first and second stock guides detachably mounted on a first one of said die members in a laterally spaced apart, mutually parallel and oppositely facing relationship for guiding the stock strip therebetween, and at least said first stock guide including:
        a rigid, strap-shaped, stationary guide rail, having:
            an inner face operably supported on said one die member;
            an outer face disposed generally parallel with and opposite said inner face;
            a leading end portion, and a trailing end portion disposed generally opposite said leading end portion of said guide rail and downstream thereof in the direction of stock strip travel;
            a side edge disposed between said inner and outer faces and having a laterally inward guide portion thereof oriented generally perpendicular with said inner and outer faces and configured to slidingly contact an adjacent side edge of the stock strip to precisely guide the same through said die;
            first and second through apertures extending through said inner and outer faces of said guide rail adjacent said leading and trailing end portions thereof respectively, and each having a generally circular plan shape with a predetermined diameter;
        a rigid, strap-shaped, retractable guide cap, having:
            an inner face generally overlying and operably supported by said guide rail;
            an outer face disposed generally parallel with and opposite said inner face of said guide cap;
            a leading end portion, and a trailing end portion disposed generally opposite said leading end portion of said guide cap and downstream thereof in the direction of stock strip travel;
            a side edge disposed between said inner and outer faces of said guide cap and having a laterally inward cap portion which protrudes laterally inwardly over said inward guide portion of said side edge of said guide rail in an extended run condition to slidingly capture the stock strip between said first and second stock guides and said one die member, and is generally aligned with said inward guide portion of said side edge of said guide rail in a retracted load/unload condition to permit the stock strip to be readily loaded into and removed from inbetween said first and second stock guides;
            first and second through apertures extending through said inner and outer faces of said guide cap adjacent said leading and trailing end portions thereof respectively, and each having a laterally oriented, generally ovate plan shape with first and second spaced apart axes of symmetry, and being defined by a generally ovate sidewall having a first arcuate portion which is disposed toward said laterally inward cap portion of said side edge, is centered generally about said first axis of symmetry and has a diameter generally commensurate with said predetermined diameter of the associated one of said first and second through apertures in said guide rail, and a second arcuate portion which is disposed away from said laterally inward cap portion of said sidewall, is centered generally about said second axis of symmetry, generally opposite said first arcuate portion, and has a diameter greater than said first arcuate portion of said ovate sidewall;
        first and second mounting studs, each having:
            an enlarged head portion at one end thereof with a tapered outer sidewall having an outside diameter with at least a portion thereof that is generally commensurate with said second arcuate portion of said ovate sidewall of the associated one of said first and second through holes in said guide cap, and is greater than the diameter of said first arcuate portion of said sidewall of the associated one of said first and second through apertures in said guide cap;
a threaded shank portion at the other end thereof, generally opposite said enlarged head portion, and shaped for insertion through an associated one of said first and second through apertures in said guide cap, an associated one of said first and second through apertures in said guide rail, and being threadedly anchored in said one die member; and
a non-threaded collar portion disposed axially between said enlarged head portion and said threaded shank portion and having a cylindrical shape with an outside diameter substantially commensurate with the associated one of said first and second through holes in said guide rail, and said first arcuate portion of said ovate sidewall of the associated one of said first and second through holes in said guide cap, whereby tightening of said first and second mounting studs in said first die member engages said tapered head portions of said first and second mounting studs against said ovate sidewalls of said first and second through apertures in said guide cap and shifts said guide cap laterally inwardly to said extended run condition to positively capture the stock strip between said first and second stock guides and said first die member and precisely guide the stock strip longitudinally along a straight line through said die, and loosening of said first and second mounting studs in said first die member facilitates laterally outward shifting of said guide cap to said retracted load/unload condition to permit the stock strip to be readily loaded into and removed from inbetween said first and second stock guides.

14. A metal forming die as set forth in claim 13, wherein:
said non-threaded collar portion of at least one of said first and second mounting studs includes a circumferentially extending retainer groove; and including
at least one retainer ring detachably received and retained in said retainer groove in said one mounting stud and having an outside diameter greater than the predetermined diameter of the associated one of said first and second through apertures in said guide rail to keep said guide rail, said guide cap and said one mounting stud assembled together as a unit when not mounted on an associated die member.

15. A metal forming die as set forth in claim 14, wherein:
said retainer ring comprises a split C-ring having a relaxed condition with an associated first outside diameter, and a tensed condition with an associated second outside diameter that is smaller than said first outside diameter associated with said relaxed condition, whereby when said one mounting stud is tightened in said one die member, said C-ring is constricted fully into said retainer groove to permit complete and secure tightening of said one mounting stud in said one die member, and when said one mounting stud is loosened in said one die member, said C-ring automatically biases to said relaxed condition to keep said guide rail, said guide cap and said one mounting stud assembled together as a unit.

16. A metal forming die as set forth in claim 13, wherein:
said threaded shank portions of said first and second mounting studs have a predetermined length which permits loosening of said first and second mounting studs in said one die member a predetermined amount sufficient to shift said guide cap between said extended run condition and said retracted load/unload condition, yet remain threadedly retained in said one die member.

17. A retractable stock guide assembly for a metal forming die having at least two mutually converging and diverging die members between which an elongate stock strip is shifted longitudinally to form parts from the stock strip, comprising:
at least one stock guide configured for detachably mounting on a first one of the die members and including:
a rigid, strap-shaped, stationary guide rail, having:
an inner face shaped for operable support on the one die member;
an outer face disposed generally parallel with and opposite said inner face;
a leading end portion, and a trailing end portion disposed generally opposite said leading end portion of said guide rail and downstream thereof in the direction of stock strip travel;
a side edge disposed between said inner and outer faces and having a laterally inward guide portion thereof oriented generally perpendicular with said inner and outer faces and configured to slidingly contact an adjacent side edge of the stock strip to precisely guide the same through the die;
first and second through apertures extending through said inner and outer faces of said guide rail adjacent said leading and trailing end portions thereof respectively, and each having a generally circular plan shape with a predetermined diameter;
a rigid, strap-shaped, retractable guide cap, having:
an inner face generally overlying and operably supported by said outer face of said guide rail;
an outer face disposed generally parallel with and opposite said inner face of said guide cap;
a leading end portion, and a trailing end portion disposed generally opposite said leading end portion of said guide cap and downstream thereof in the direction of stock strip travel;
a side edge disposed between said inner and outer faces of said guide cap and having a laterally inward cap portion which protrudes laterally inwardly over said inward guide portion of said side edge of said guide rail in an extended run condition to slidingly capture at least a portion of the stock strip between said stock guide and the one die member, and is generally aligned with said inward guide portion of said side edge of said guide rail in a retracted load/unload condition to permit at least a portion of the stock strip to be readily loaded into and removed from said stock guide;
first and second through apertures extending through said inner and outer faces of said guide cap adjacent said leading and trailing end portions thereof respectively, and each having a laterally oriented, generally ovate plan shape with first and second spaced apart axes of symmetry, and being defined by a generally ovate sidewall having a first arcuate portion which is disposed toward said laterally inward cap portion of said side edge, is centered generally about said first axis of symmetry and has a diameter generally commensurate with said predetermined diameter of the associated one of said first and second through apertures in said guide rail, and a second arcuate portion which is disposed away from said laterally inward cap portion of said side edge, is centered generally about said second axis of symmetry, generally opposite said first arcuate portion of said ovate sidewall, and has a diameter greater than said first arcuate portion of said ovate sidewall;

first and second mounting studs, each having:
- an enlarged head portion at one end thereof with a tapered outer sidewall having an outside diameter with at least a portion thereof that is generally commensurate with said second arcuate portion of said ovate sidewall of the associated one of said first and second through holes in said guide cap, and is greater than the diameter of said first arcuate portion of said ovate sidewall of the associated one of said first and second through apertures in said guide cap;
- a threaded shank portion at the other end thereof, generally opposite said enlarged head portion, and shaped for insertion through an associated one of said first and second through apertures in said guide cap, an associated one of said first and second through apertures in said guide rail, and being threadedly anchored in the one die member; and
- a non-threaded collar portion disposed axially between said enlarged head portion and said threaded shank portion and having a cylindrical shape with an outside diameter substantially commensurate with the associated one of said first and second through holes in said guide rail, and said first arcuate portion of said ovate sidewall of the associated one of said first and second through holes in said guide cap, whereby tightening of said first and second mounting studs in the first die member engages said tapered head portions of said first and second mounting studs against said ovate sidewalls of said first and second through apertures in said guide cap and shifts said guide cap laterally inwardly to said extended run condition to positively capture at least a portion of the stock strip between said stock guide assembly and the first die member and precisely guide the stock strip longitudinally along a straight line through the die, and loosening of said first and second mounting studs in the first die member facilitates laterally outward shifting of said guide cap to said retracted load/unload condition to permit the stock strip to be readily loaded into and removed from said stock guide.

18. A retractable stock guide assembly as set forth in claim 17, wherein:
said non-threaded collar portion of at least one of said first and second mounting studs includes a circumferentially extending retainer groove; and including
at least one retainer ring detachably received and retained in said retainer groove in said one mounting stud and having an outside diameter greater than the predetermined diameter of the associated one of said first and second through apertures in said guide rail to keep said guide rail, said guide cap and said one mounting stud assembled together as a unit when not mounted on an associated die member.

19. A retractable stock guide assembly as set forth in claim 18, wherein:
said retainer ring comprises a split C-ring having a relaxed condition with an associated first outside diameter, and a tensed condition with an associated second outside diameter that is smaller than said first outside diameter associated with said relaxed condition, whereby when said one mounting stud is tightened in an associated die member, said C-ring is constricted fully into said retainer groove to permit complete and secure tightening of said one mounting stud in the associated die member, and when said one mounting stud is loosened in the associated die member, said C-ring automatically biases to said relaxed condition to keep said guide rail, said guide cap and said one mounting stud assembled together as a unit.

20. A retractable stock guide assembly as set forth in claim 19, wherein:
said threaded shank portions of said first and second mounting studs have a predetermined length which permits loosening of said first and second mounting studs in the associated die member a predetermined amount sufficient to shift said guide cap between said extended run condition and said retracted load/unload condition, yet remain threadedly retained in the associated die member.

* * * * *